United States Patent
Nishida et al.

(10) Patent No.: US 9,436,024 B2
(45) Date of Patent: Sep. 6, 2016

(54) LATERAL ELECTRIC FIELD TYPE LIQUID CRYSTAL DISPLAY DEVICE

(71) Applicant: NLT Technologies, Ltd., Kanagawa (JP)

(72) Inventors: Shinichi Nishida, Kanagawa (JP); Hidenori Ikeno, Kanagawa (JP); Hideki Ito, Kanagawa (JP); Mitsuhiro Sugimoto, Kanagawa (JP)

(73) Assignee: NLT TECHNOLOGIES, LTD, Kanagawa (JP)

( * ) Notice: Subject to any disclaimer, the term of this patent is extended or adjusted under 35 U.S.C. 154(b) by 565 days.

(21) Appl. No.: 13/781,797

(22) Filed: Mar. 1, 2013

(65) Prior Publication Data

US 2013/0229588 A1   Sep. 5, 2013

(30) Foreign Application Priority Data

Mar. 1, 2012   (JP) ................. 2012-045911

(51) Int. Cl.
*G02F 1/1335* (2006.01)
*G02F 1/133* (2006.01)
*G02F 1/13363* (2006.01)
*G02F 1/1337* (2006.01)

(52) U.S. Cl.
CPC ..... *G02F 1/13306* (2013.01); *G02F 1/133634* (2013.01); *G02F 2001/133631* (2013.01); *G02F 2001/133633* (2013.01); *G02F 2001/133757* (2013.01); *G02F 2413/03* (2013.01); *G02F 2413/07* (2013.01)

(58) Field of Classification Search
CPC ....... G02F 2001/133631; G02F 2001/133633; G02F 2001/133635; G02F 2001/133637; G02F 2413/09
USPC .......................................... 349/75
See application file for complete search history.

(56) References Cited

U.S. PATENT DOCUMENTS

| 5,589,963 | A * | 12/1996 | Gunning, III | G02F 1/133753 349/118 |
| 6,583,839 | B2 | 6/2003 | Suzuki et al. | |
| 6,987,551 | B2 | 1/2006 | Suzuki et al. | |
| 7,227,602 | B2 | 6/2007 | Jeon et al. | |
| 7,495,734 | B2 | 2/2009 | Suzuki et al. | |
| 7,920,238 | B2 | 4/2011 | Kajita et al. | |
| 8,134,665 | B2 | 3/2012 | Kajita et al. | |
| 2002/0063827 | A1* | 5/2002 | Wu | G02B 5/3016 349/117 |
| 2003/0081163 | A1* | 5/2003 | Suzuki | G02F 1/134363 349/139 |
| 2005/0206817 | A1* | 9/2005 | Kajita | G02F 1/13363 349/119 |
| 2006/0176424 | A1* | 8/2006 | Kajita | G02F 1/13363 349/96 |
| 2006/0203158 | A1* | 9/2006 | Parri | G02F 1/133634 349/117 |

FOREIGN PATENT DOCUMENTS

| CN | 1181517 | 5/1998 |
| CN | 1645205 | 7/2005 |
| CN | 1777834 | 5/2006 |
| JP | 11-133408 | 5/1999 |
| JP | 2008-96863 | 4/2008 |

OTHER PUBLICATIONS

Japanese Official Action—201310063308.6—Mar. 4, 2016.

* cited by examiner

*Primary Examiner* — Jessica M Merlin
*Assistant Examiner* — Mark Teets
(74) *Attorney, Agent, or Firm* — Young & Thompson

(57) ABSTRACT

To acquire a fine viewing angle property from oblique view fields in a lateral electric field type liquid crystal display device having liquid crystal initial alignment directions in two orthogonal directions. The absorption axis of the incident-side polarization plate and the absorption axis of the exit-side polarization plate are orthogonal to each other in both of the region I and the region II, and the liquid crystal layer, the in-cell retarder as an optical compensation layer, the A-plate, and the C-plate sandwiched therebetween are in parallel to either one of the absorption axes or orthogonal to the substrates. Therefore, the transmittance can be suppressed to be low and a fine black display can be acquired even when the display surface is viewed from the oblique view fields.

10 Claims, 42 Drawing Sheets

LATERAL ELECTRIC FIELD TYPE LIQUID CRYSTAL DISPLAY DEVICE

CROSS-REFERENCE TO RELATED APPLICATION

This application is based upon and claims the benefit of priority from Japanese patent application No. 2012-045911, filed on Mar. 1, 2012, the disclosure of which is incorporated herein in its entirety by reference.

BACKGROUND OF THE INVENTION

1. Field of the Invention

The present invention relates to a lateral electric field type liquid crystal display device which exhibits an excellent characteristic in the viewing angle property.

2. Description of the Related Art

While the widely used TN (Twisted Nematic) system, can provide high, contrast, there is also an issue that the visual angle dependency thereof is tremendous since the liquid crystal molecule axes are raised by the perpendicular electric field. Recently, there is a strong demand to acquire same picture qualities from any directions with large-scaled monitors of TV (television sets) as well as portable information terminals. In order to fulfill such demand, it has become popular to employ systems such as the IPS (In-plane Switching) and the FFS (Fringe field Switching), with which the liquid crystal is rotated in a plane that is almost in parallel to the substrate by applying a lateral electric field that is substantially in parallel to the substrate.

Those lateral electric field systems rotate the molecule axes of the nematic liquid crystal aligned horizontally within a plane that is in parallel to the substrate by using the lateral electric field.

With the lateral electric field systems, it is possible to suppress changes in the picture quality caused depending on the viewing angle directions according to the rise of the liquid crystal molecule axes. Therefore, the viewing angle property can be improved.

However, the viewing angle property is not perfect even in the case of the lateral electric field systems, and slight shift is generated depending on the alignment directions of the liquid crystal molecules and the directions of the absorption axis of the polarization plate. With FFS in particular, the voltage-transmittance is shifted to the low voltage side when viewed from an oblique view field of the initial alignment direction of the liquid crystal.

It is therefore an exemplary object of the present invention to provide a lateral electric field type liquid crystal display device with which a fine black display can be acquired even when viewed from any viewing angles by suppressing the transmittance when viewed, from oblique viewing field at the time of black display.

SUMMARY OF THE INVENTION

The lateral electric field type liquid crystal display device according to an exemplary aspect of the invention includes: two transparent insulating substrates that are in parallel to each other; a liquid crystal layer sandwiched between the substrates, the liquid crystal layer including liquid crystal which is aligned in a direction substantially in parallel to the substrates and to which a lateral electric field, substantially in parallel to the substrates is applied; a region I and a region II where initial alignment directions of the liquid crystal are orthogonal to each other; two polarization plates having absorption axes that are orthogonal to each other and match either one of the initial alignment directions of the region I and the region II, one each of the polarization plates being disposed on outside of the two substrates, respectively; a first, optical compensation layer disposed between at least one of the substrates and the liquid crystal layer, the compensation layer exhibiting uniaxial optical anisotropy in a direction, same as the initial alignment direction of the liquid crystal; a second optical compensation layer disposed between one of the substrates and the polarization plate disposed on that substrate side, the compensation layer exhibiting uniaxial optical anisotropy in a direction in parallel to an absorption axis of the polarization plate; and a third optical compensation layer disposed between the second optical compensation layer and the polarization plate closest to the second optical compensation layer, the compensation layer exhibiting uniaxial optical anisotropy in a direction perpendicular to the substrate.

DETAILED DESCRIPTION OF THE PREFERRED EMBODIMENTS

Figure 1:
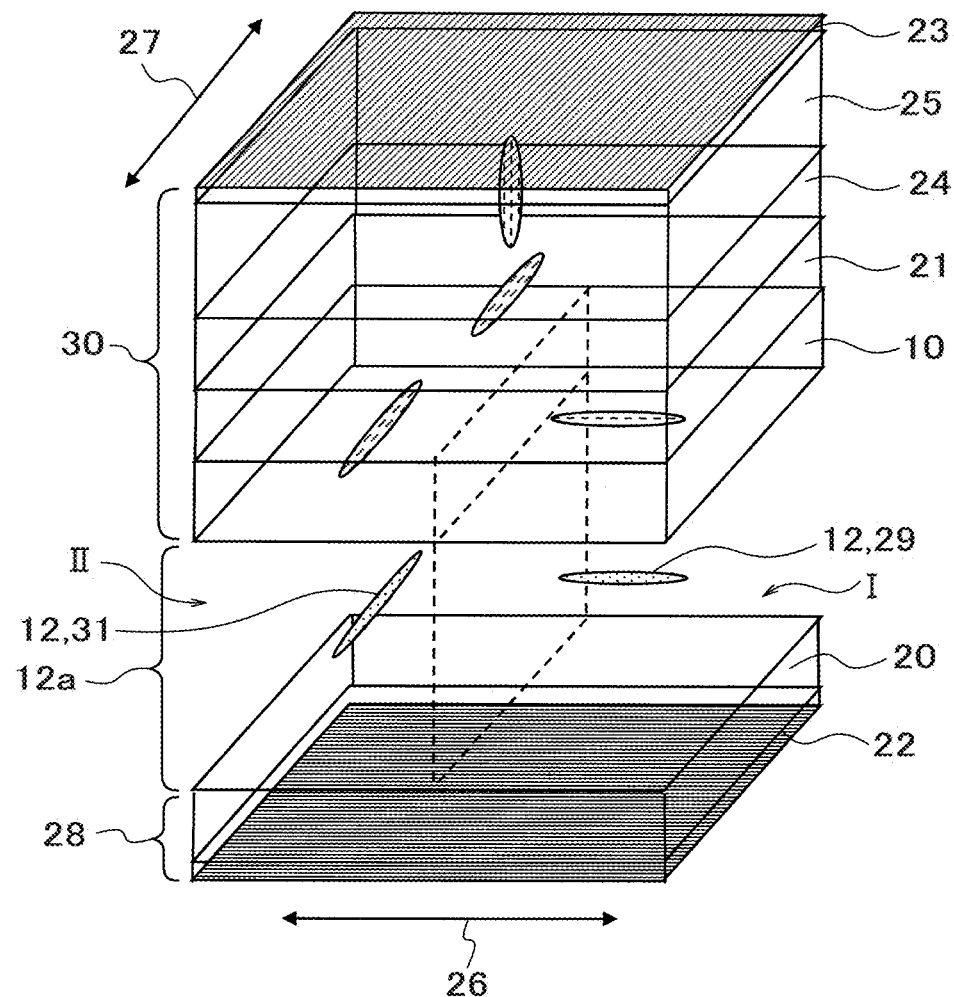
FIG. 1 is a perspective view showing the structure of one pixel in a liquid crystal display device according to a first exemplary embodiment.

Hereinafter, modes for embodying the present invention (referred to as "exemplary embodiments" hereinafter) will be described by referring to the accompanying drawings. In this Specification and the drawings, same reference numerals are used for substantially the same structural elements. The shapes in the drawings are illustrated to be easily comprehended by those skilled in die art, so that the dimensions and ratios thereof do not necessarily correspond to actual ones.

Figure 25:
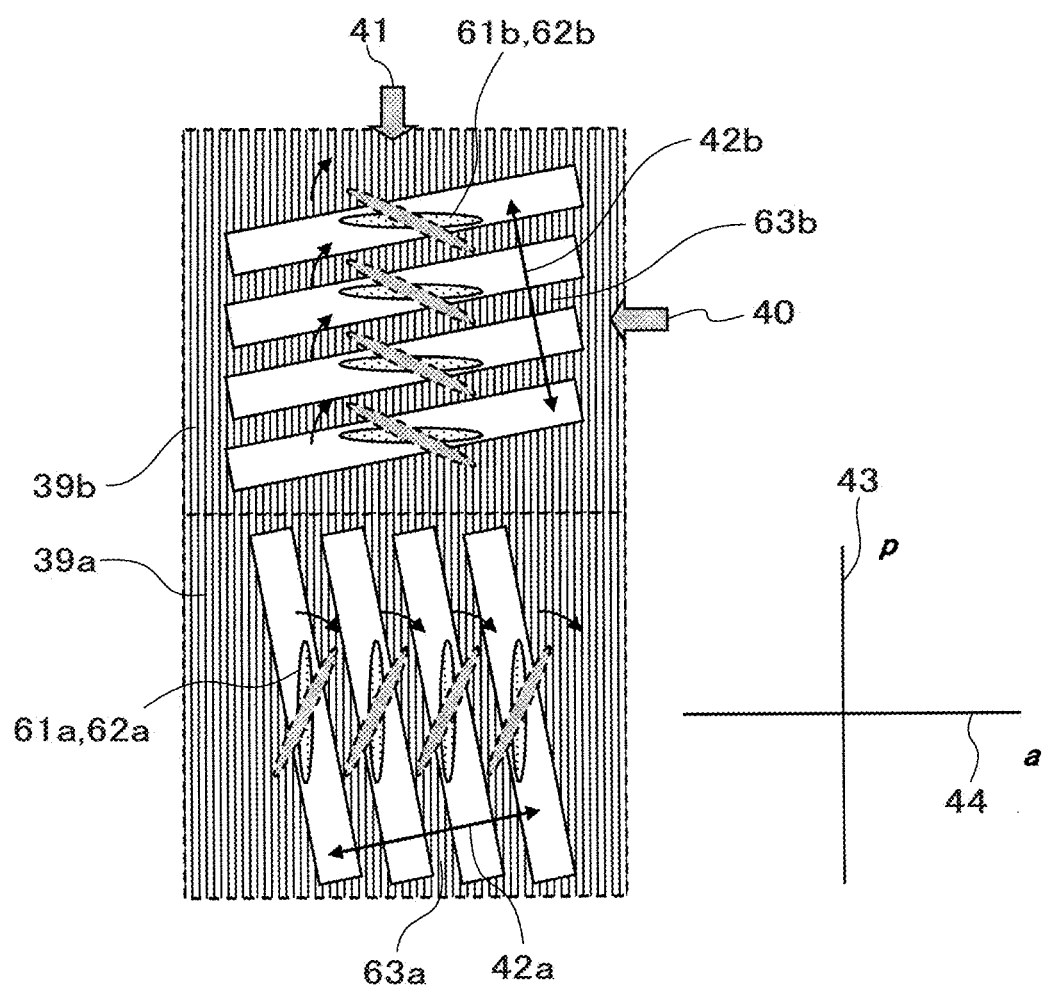
FIG. 25 is a plan view showing a related technique 1 in which the alignment direction of the liquid crystal of one pixel is divided into two directions that are orthogonal, to each other.
Figure 26A:
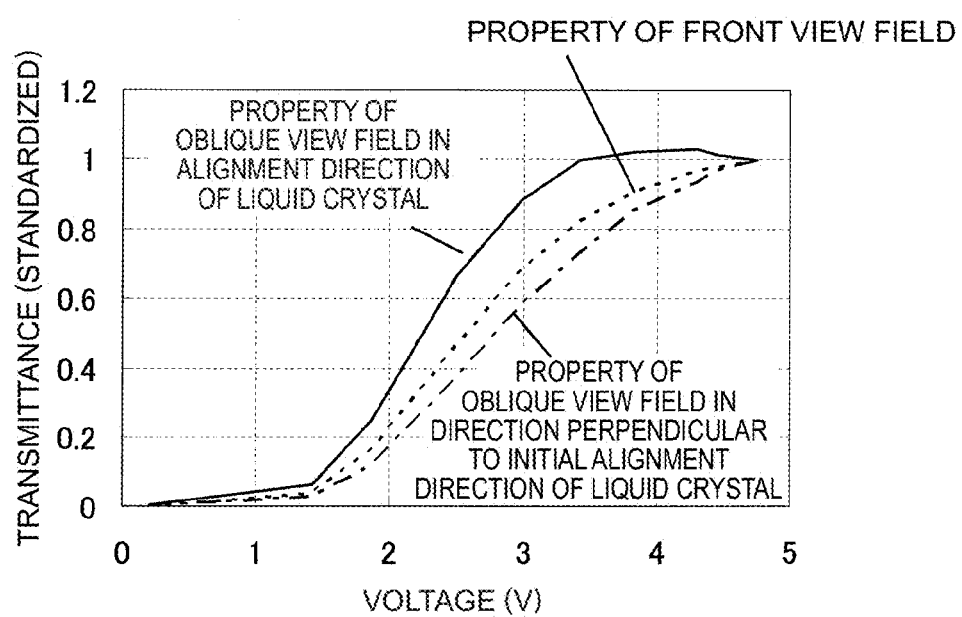
FIG. 26A is a graph showing an example of the improvement regarding the viewing angle property of voltage-luminance property achieved by the related technique 1.

First, FIG. 25 shows a related technique 1 (undisclosed) which suppresses the shift of the voltage-transmittance property described above. In the related technique 1, a pixel of an FFS-mode lateral electric field type liquid crystal display device is divided into two regions 39a, 39b, an initial alignment direction 62a of liquid crystal 61a of the region 39a is set to be orthogonal to an initial alignment direction 62b of liquid crystal 61b of the region 39b, the extending direction of a striped electrode 63a is set to be orthogonal to the extending direction of a striped electrode 63b so that a lateral electric field 42a becomes orthogonal to a lateral electric field 42b, and an angle formed between the striped electrode 63a and the initial alignment direction 62a and an angle formed, between the striped electrode 63b and the initial alignment direction 62b are equivalent FIG. 25 discloses an oblique view field 40 of the initial alignment direction 62b, the oblique view field 40 in a direction orthogonal to the initial, alignment direction 62a, an oblique view field 41 of the initial alignment direction 62a, the oblique view field 41 orthogonal to the initial alignment, direction 62b, an absorption axis 43 of an incident-side polarization plate, an absorption axis 44 of an exit-side polarization plate, etc. With this, the liquid crystals 61a and 61b can be rotated while keeping the orthogonal, state of the directions of the liquid crystals 61a, 61b of the two regions 39a, 39b when changing the transmittance by rotating the liquid crystals 61a, 61b by using the lateral electric fields 42a, 42b. As shown in FIG. 26A, the voltage-transmittance property shifts to the low-voltage side in the region 39b when viewed from the oblique view field 40 of the initial alignment direction 62b. Inversely, the voltage-transmittance property shifts to the high-voltage side when viewed from the oblique view field 41 that is in the direction orthogonal to the initial alignment direction 62b. This is the same also in the region 39a. In the meantime, by combining the two regions 39a and 39b as shown in FIG. 2-6B, the viewing angle properties of the both are leveled. Thereby, it can be made closer to the property almost, equivalent to that of the front, view even when viewed from the initial alignment directions 62a, 62b and the direction orthogonal to those.

Figure 27A:
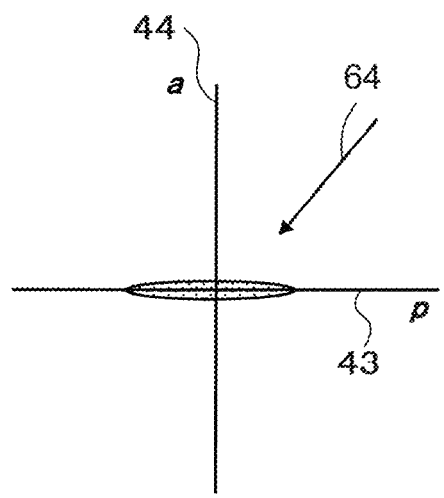
FIG. 27A is a chart showing a factor which causes a luminance increase from an oblique view field in black display of a typical lateral electric field type liquid crystal, display device.
Figure 27B:
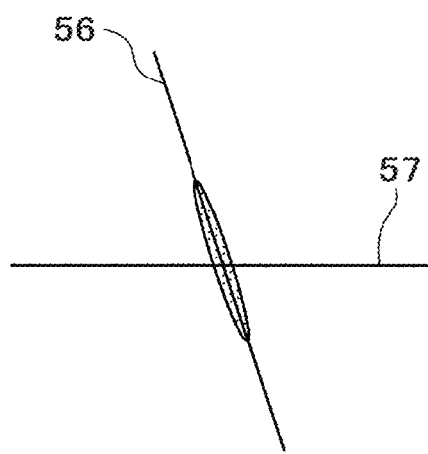
FIG. 27B is a chart showing a factor which causes a luminance increase from an oblique view field in black display of a typical lateral electric field type liquid crystal display device.

In the meantime, while the property from the oblique view fields in black display is relatively fine in the lateral electric field type liquid crystal display device, it is known that the black transmittance is increased slightly when viewed from oblique view fields in the directions at 45 degrees from the orthogonal polarization plate absorption axes. FIG. 27 shows this state. FIG. 27A discloses the absorption axis 43 of the incident-side polarization plate, the absorption axis 44 of the exit-side polarization plate, a direction 64 making an angle of 45 degrees with respect to the absorption axes 43, 44, etc. FIG. 27B discloses a polarization axis 56 of the incident-side polarisation plate, a polarization axis 57 of the exit-side polarization plate, etc.

In general, in the lateral electric field type liquid crystal display device, the liquid crystal is disposed between the two polarization plates whose absorption axes 43, 44 are orthogonal to each other in such a manner that the initial alignment direction matches either one of the absorption axes 43, 44 (FIG. 27A). In this state, when viewed from the view field tilted from the substrate normal direction from the direction 64 that forms an angle of 45 degrees from the directions of the absorption axes 43, 44 of the both polarization plates, the directions of the polarization axes 56, 57 of the both polarization plates are not orthogonal to each other. This causes an increase in the transmittance at the time of black display as described above (FIG. 27B).

Figure 28:
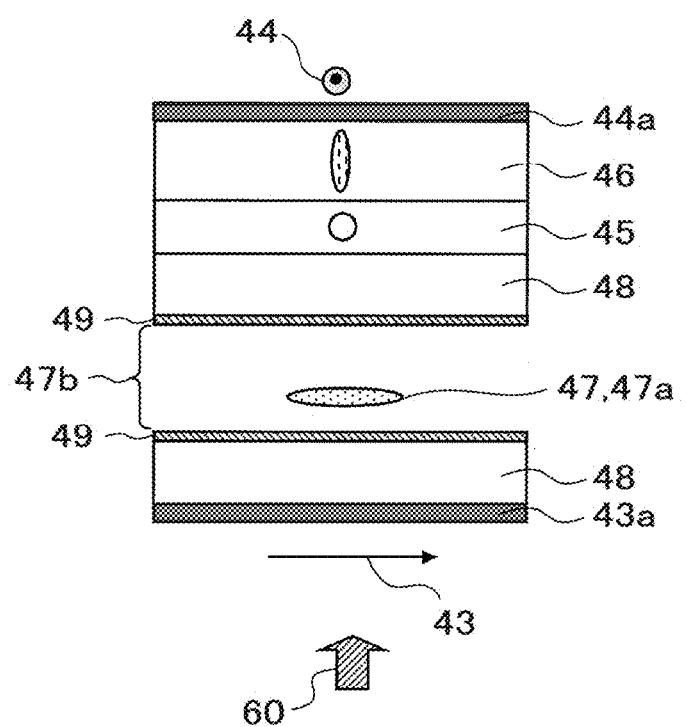
FIG. 28 is a sectional view showing a related technique 2 which suppresses a luminance increase from, an oblique view field in black display of a lateral electric field type liquid crystal display device.

With the display devices required to provide a high display quality, it is desired to suppress such increase in the black luminance from the oblique view field. A related technique 2 (see Japanese Unexamined Patent Publication Hei 11-133408 (Patent Document 1)) shown in FIG. 28 for achieving it will be described. FIG. 28 discloses an incident-side polarization plate 43a, an absorption axis 43 of the incident-side polarization plate 43a, an exit-side polarization plate 44a, an absorption axis 44 of the exit-side polarization plate 44a, an A-plate 45, a C-plate 46, a liquid crystal 47a, an initial alignment direction 47 of the liquid crystal 47a, a liquid crystal 47b, two transparent insulating substrates 48, two alignment films 49, etc.

First, the initial alignment direction 47 of the liquid, crystal 47a is set to match the absorption axis 43 of the incident-side polarization plate 43a. The A-plate 45 and the C-plate 46 are disposed between the exit-side polarization plate 44a and the liquid crystal layer 47b in this order from the side closer to the liquid layer 47b, and the absorption axis 44 of the exit-side polarization plate 44a is set to be orthogonal to the initial alignment direction 47. The A-plate 45 is a phase compensation layer exhibiting positive uniaxial refractive index anisotropy in the direction orthogonal to the initial alignment direction 47. The C-plate 46 is a phase compensation layer exhibiting positive uniaxial refractive index anisotropy in the direction perpendicular to the substrate 48.

Figure 29A:
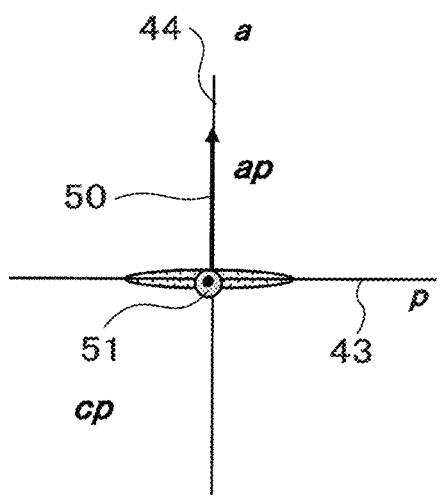
FIG. 29A is a chart showing the principle of the related technique 2 shown in FIG. 28.
Figure 29B:
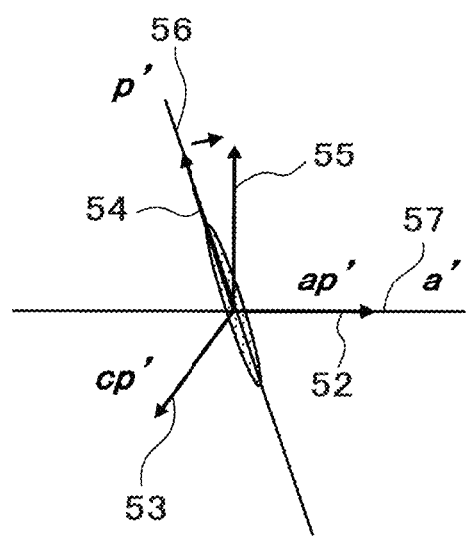
FIG. 29B is a chart showing the principle of the related technique 2 shown in FIG. 28.

FIG. 29A discloses the absorption axis 43 of the incident-side polarization plate 43a, the absorption axis 44 of the exit-side polarization plate 44a, an axis direction 50 of the A-plate 45, and an axis direction 51 of the C-plate 46. FIG. 29B discloses a normal light direction 52 of the A-plate 45 perpendicular to the light ray when viewed from the oblique view field, a normal light direction 53 of the C-plate 46 perpendicular to the light ray, a polarization direction 54 after passing through the liquid crystal 47a, a polarization direction 55 after passing through the A-plate 45 and the C-plate 46, a polarization axis 56 of the incident-side polarization plate 43a, and a polarization axis 57 of the exit-side polarization plate 44a.

Through disposing the optical axes of each layer in the manner described above and optimizing the parameters of each element, the light transmitted through the incident-side polarization plate 43a transmits through the liquid crystal layer 47b as it is when viewed in the oblique view field from the direction making an angle of 45 degrees with respect to the absorption axes 43, 44 of the polarization plates 43a, 44a since the direction of the transmission axis of the incident-side polarization plate 43a matches the direction of the minor axis of the light ray of the liquid crystal director sensing the light ray as shown in FIG. 29A and FIG. 29B. Further, the polarization direction of the light is rotated by the A-plate 45 and the C-plate 46 existing between the liquid crystal layer 47b and the exit-side polarization plate 44a and changed to the direction that is almost orthogonal to the transmission axis of the exit side. Thus, the light is almost blocked by the exit-side polarization plate 44a, so that the light leakage can be suppressed.

Figure 30A:
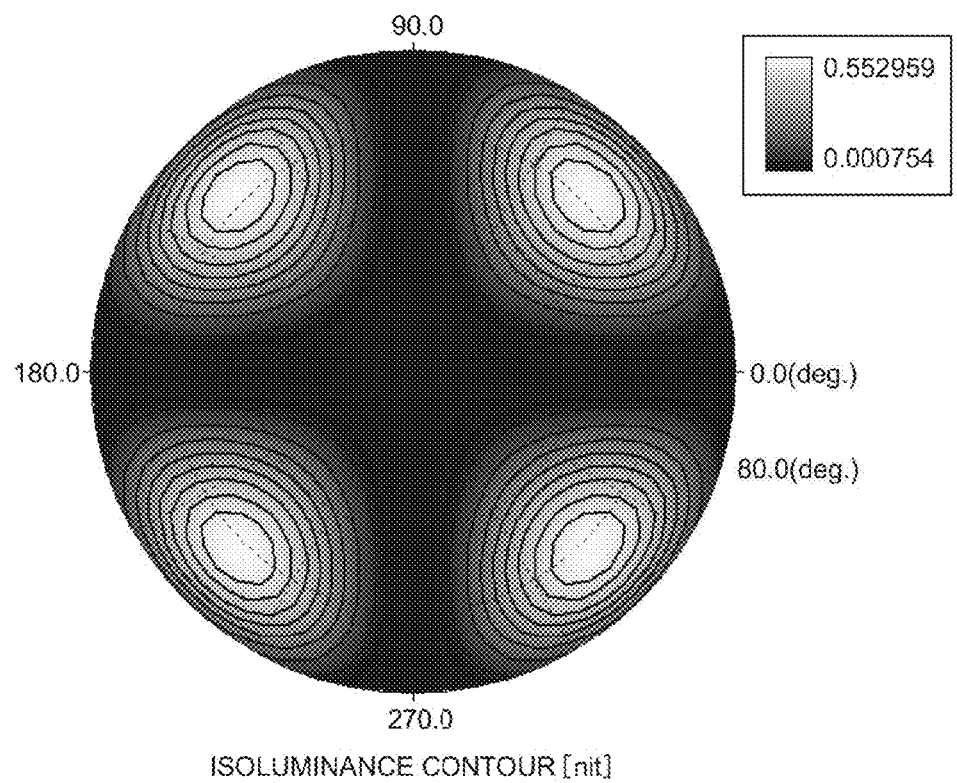
FIG. 30A is an illustration showing an example of the improvement in the viewing angle of black display according to the related technique 2 shown, in FIG. 28.
Figure 30B:
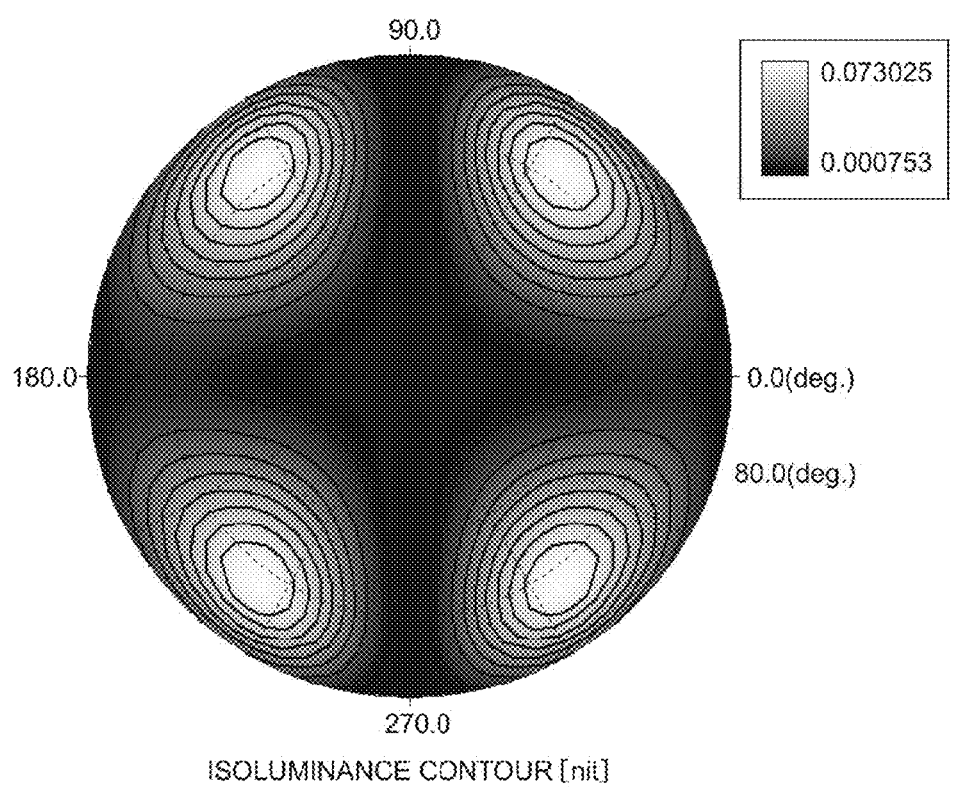
FIG. 30B is an illustration showing an example of the improvement in the viewing angle of black display according to the related technique 2 shown in FIG. 28.

FIG. 30A shows the black viewing angle property of a case where the phase compensation layer is not provided, and FIG. 30B shows the black viewing angle property of a case where the phase polarization layer that is a combination of the C-plate 46 and the A-plate 45 is provided. FIG. 30A and FIG. 30B show the isoluminance distribution of black display when designating the azimuth angle (0 to 360 degrees) of the viewing angle and the polar angle (0 to 80 degrees) in a case where the liquid crystal alignment direction is set as the direction of 90 degrees. In the property of FIG. 30A where the phase compensation layer is not provided, it is about 0.55 cd/m$^2$ in the vicinity of the azimuth, angle of 45 degrees and the polar angle of 60 degrees. In the meantime, in the property of FIG. 30B where the phase compensation layer is provided. It is about 0.073 cd/m$^2$ at the maximum. Thus, the black luminance in the oblique view field can be suppressed dramatically. Note that FIG. 30A and FIG. 30B show isoluminance contour (nit), and "nit" is the same dimension as "cd/m$^2$".

Such conversion of the polarization axis by the combination of the A-plate 45 and the C-plate 46 can also be done by providing a layer of an equivalent biaxial optical compensation layer.

Figure 31A:
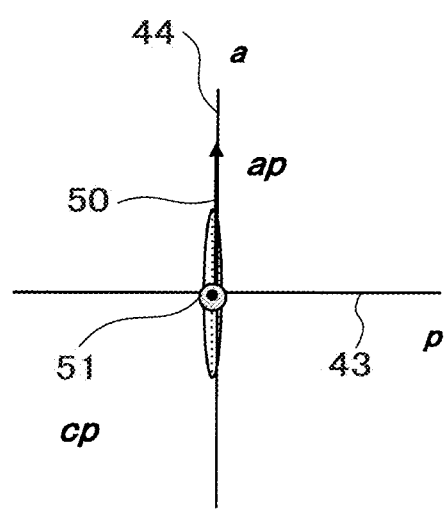
FIG. 31A is a chart showing a reason of an issue generated when the related technique 2 shown in FIG. 28 is employed to the related technique 1 shown in FIG. 25.
Figure 31B:
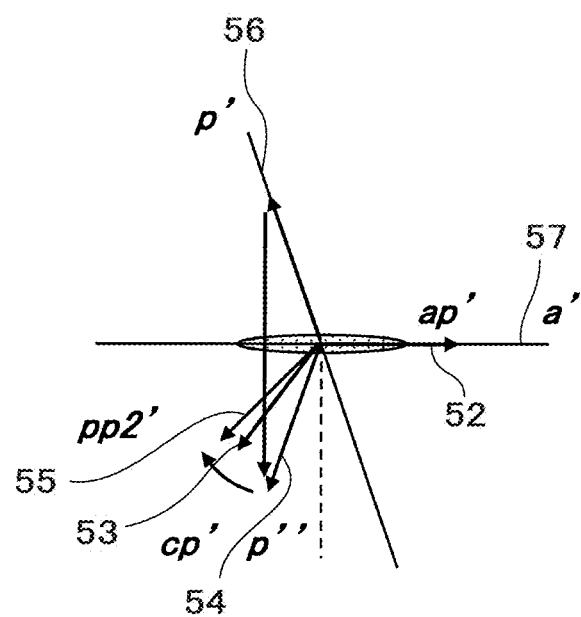
FIG. 31B is a chart showing a reason of an issue generated, when the related technique 2 shown in FIG. 28 is employed to the related technique 1 shown in FIG. 25.

However, in the case of the related technique 1, i.e., in the case where the initial alignment direction of the liquid crystal is set as two directions that are orthogonal to each other, the black property from the oblique view field cannot be improved even with the use of the optical layout that is same as the case of the related technique 2. FIGS. 31A and 31B show that state. FIG. 31A shows the absorption axis 43 of the incident-side polarization plate, the absorption axis 44 of the exit-side polarization plate, the axis direction 50 of the A-plate, and the axis direction 51 of the C-plate. FIG. 31B shows the normal light direction 52 of the A-plate perpendicular to the light ray, the normal light direction 53 of the C-plate perpendicular to the light ray, the polarization direction 54 after passing through the liquid crystal, the polarization direction 55 after passing through the A-plate and the C-plate, the polarization axis 56 of the incident-side polarization plate, and the polarization axis 57 of the exit-side polarization plate.

First, the polarization direction of the light passed through the incident-side polarization plate becomes the direction of p'. In the case where the initial alignment directions of the liquid crystal layer are two orthogonal directions, one of the directions is designed as the direction orthogonal, to the absorption axis 43 of the incident-side polarization plate. With the initial alignment directions, the direction of the minor axis of the liquid crystal director does not match, the direction of p'. Thus, the direction of the polarization axis of the light passed through, the liquid crystal layer comes to be in the direction different from the direction of p'. In the case of the lateral electric field type liquid crystal display device, it is common to provide the liquid crystal layer with retardation almost equivalent to that of a λ/2 plate to maximize the white transmittance when viewed from the front. In such case where the retardation of the liquid crystal layer is set as λ/2, the polarization, direction is changed to the direction symmetric to the direction of the minor axis of the liquid crystal, director which matches the direction of a'.

Figure 32:
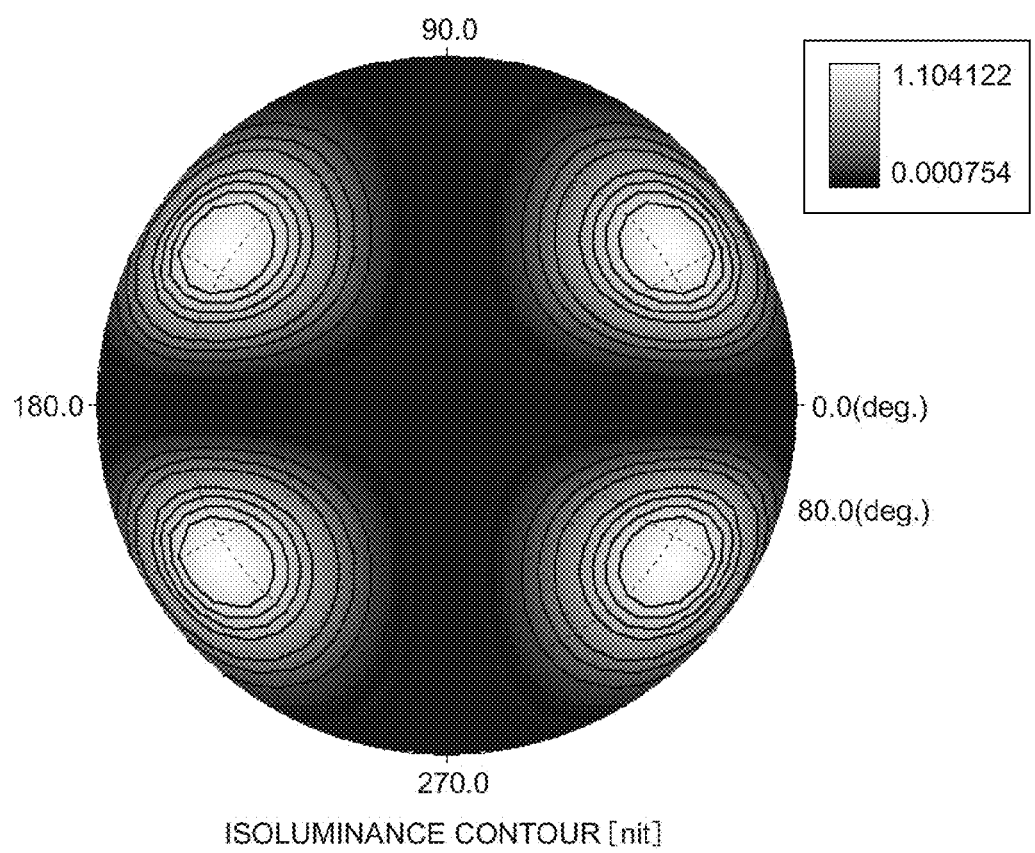
FIG. 32 is an illustration showing the deterioration in the viewing angle property in black display generated when the related technique 2 shown in FIG. 28 is employed to the related technique 1 shown in FIG. 25.

The polarization direction of the light passing through the A-plate and the C-plate is shifted to the direction away from the direction, of the absorption axis 44 of the exit-side polarization plate orthogonal to a' since it is rotated clockwise as shown in FIG. 31A and FIG. 31B. Thus, the optical compensation layer constituted with the A-plate and the C-plate increases the transmittance inversely, thereby providing the black viewing angle property as shown in FIG. 32. In the property shown in FIG. 32, the black luminance of the oblique view field is 1.1 cd/m², which, is deteriorated than the case shown in FIG. 30A in which the phase compensation is not employed. That is, even when the related technique 1 and the related technique 2 are employed, the black viewing angle in one of the regions cannot be suppressed. Therefore, as a whole, there is an issue that the fine black display viewing angle property by the effect of phase compensation cannot, be acquired.

Therefore, it is an exemplary object of the following exemplary embodiment 1 to provide a lateral electric field type liquid crystal display device of an orthogonal alignment, which is capable of acquiring a fine black display even when viewed from any viewing angles by suppressing the transmittance when viewed from the oblique view fields at the time of black display.

First Exemplary Embodiment

Figure 2:
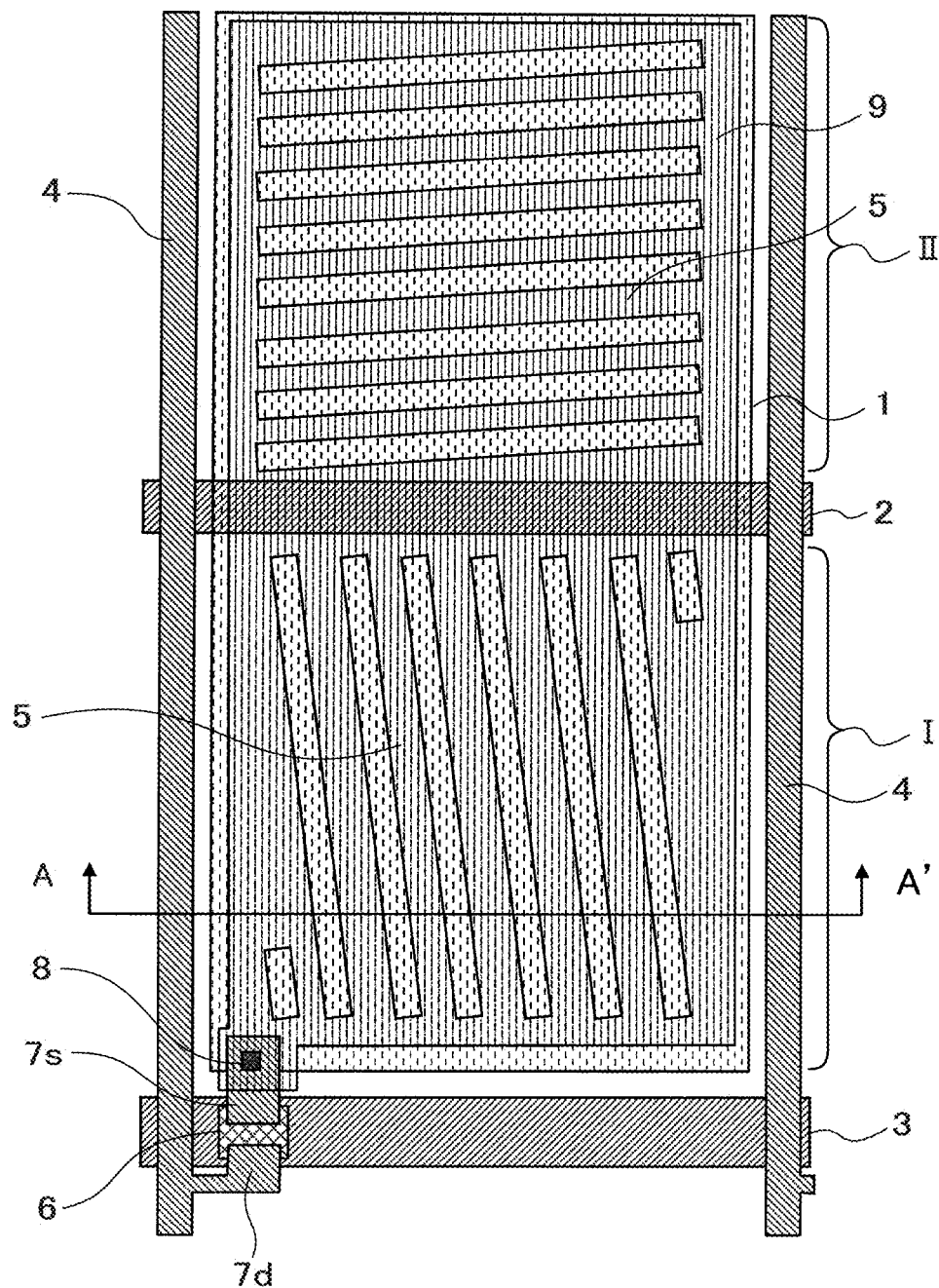
FIG. 2 is a plan, view showing the structure of one pixel in die liquid crystal display device according to the first exemplary embodiment.
Figure 3:
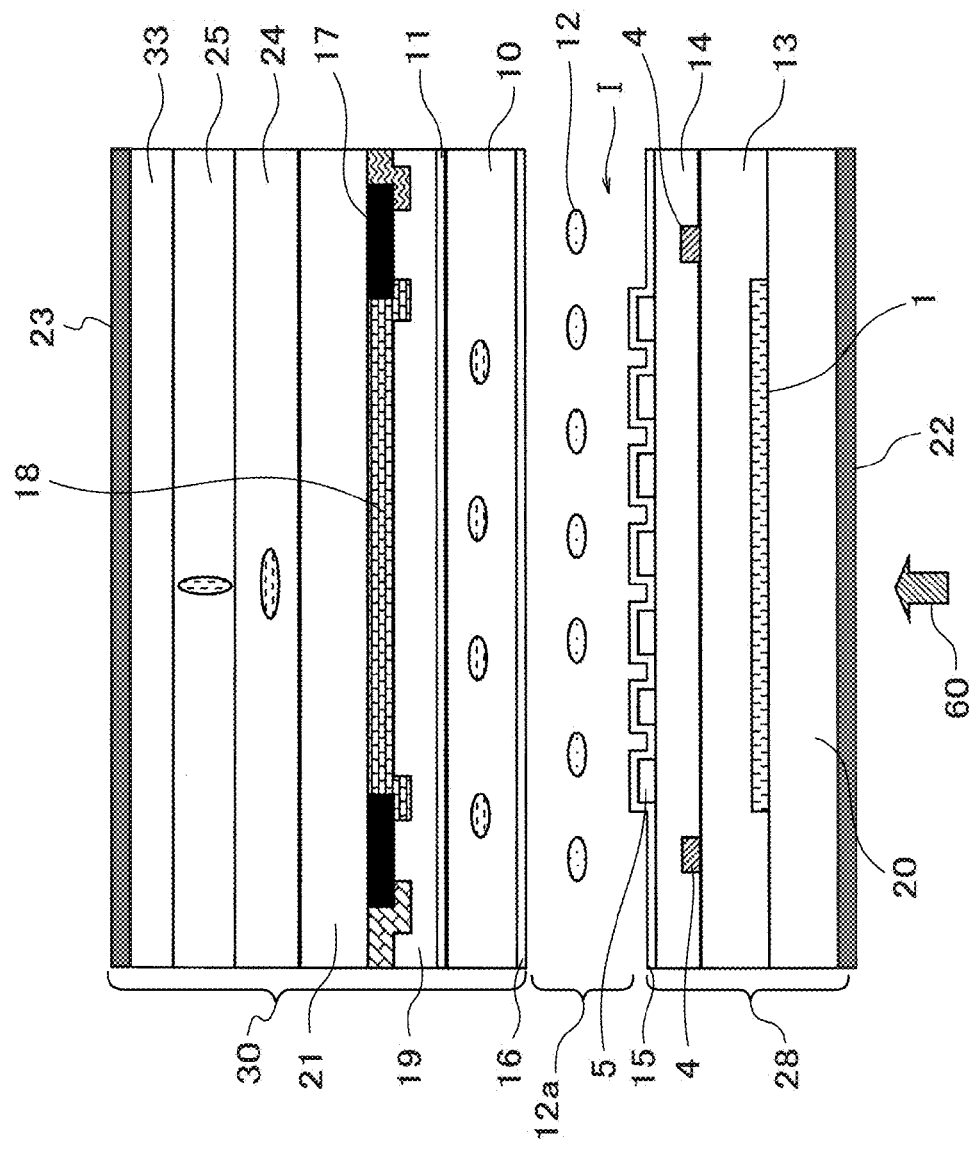
FIG. 3 is a sectional view taken along line A-A' of FIG. 2.
Figure 4:
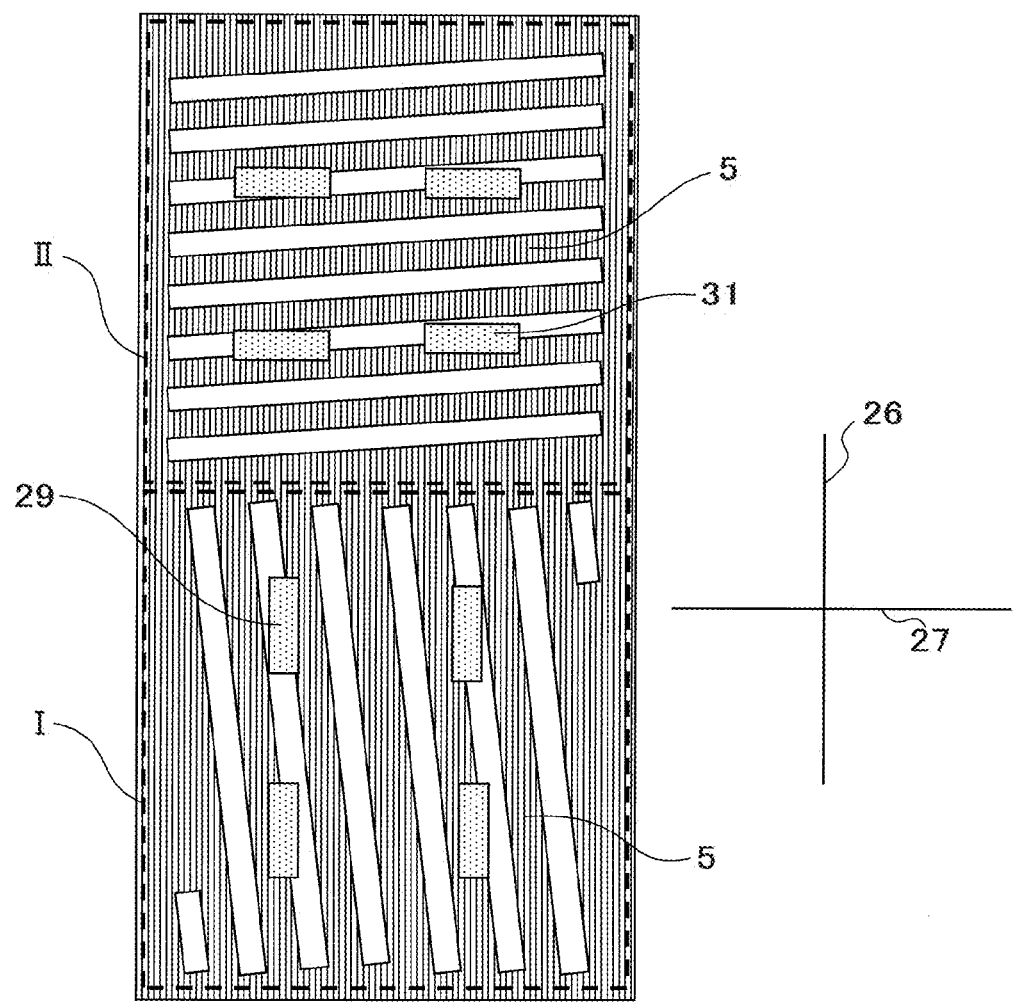
FIG. 4 is a plan view showing an alignment state of one pixel in the liquid crystal display device according to the first exemplary embodiment.
Figure 5:
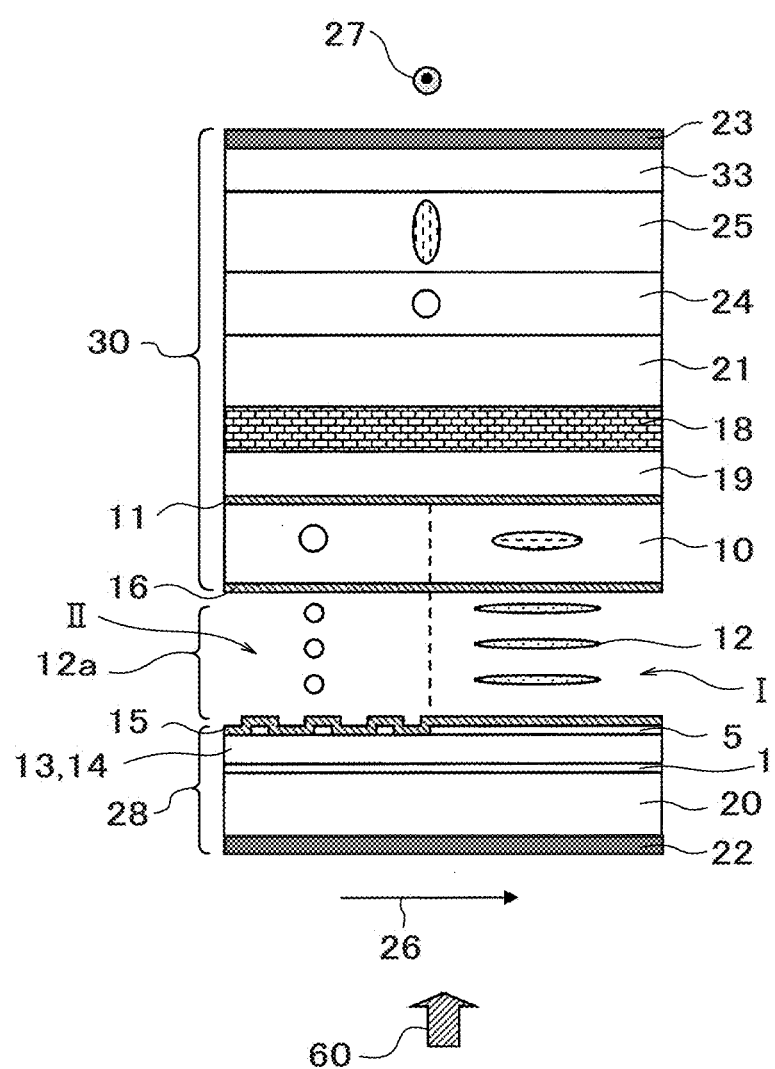
FIG. 5 is a sectional view showing a layout of optical, elements in the liquid crystal display device according to the first exemplary embodiment.

The first exemplary embodiment of the present invention will be described by referring to FIG. 1, FIG. 2. FIG. 3, FIG. 4, and FIG. 5. That is, reference numerals used in the explanations herein are disclosed in some of the drawings FIG. 1 to FIG. 5. FIG. 1 shows the structures of the main elements serving as the optical functions of one pixel of the liquid crystal display device according to the first exemplary embodiment (illustrations thereof are partially omitted), FIG. 2 is a plan view of one pixel. FIG. 3 shows a sectional view taken along the line A-A' of FIG. 2. FIG. 4 shows a state where the initial alignment direction in a display region of the pixel is divided. FIG. 5 shows a schematic sectional view of the structure acquired by the division. Hereinafter, the first exemplary embodiment will be described in details by following the fabricating procedure.

First, 50 nm of ITO (Indium tin oxide) is deposited, as a first transparent conductive film on a transparent insulating substrate 20 constituted with a first glass substrate, and a pattern of a plan common electrode 1 is formed on the ITO.

Further, 250 nm of chrome (Cr) is deposited thereon as a first metal, layer, and patterns of a scan line 3 and a common signal wiring 2 are formed on the chrome.

Subsequently, 400 nm of silicon nitride (SiNx) is deposited as a gate insulating film 13, 200 nm of amorphous silicon hydride (a-Si: H) and 50 nm of n-type amorphous silicon hydride (n-a-Si; H) are deposited in a stacked manner as a thin film semiconductor layer 6, and patterning is performed by leaving the thin film, semiconductor layer 6 only in a TFT (thin film transistor) part to be a switching element of the pixel. Furthermore, 250 nm of chrome is deposited as a second metal layer, and a part of patterns of a data line 4, a source electrode 7s as well, as a drain electrode 7d of the TFT, and a pixel electrode 5 constituted with the second metal layer is formed on the chrome.

Subsequently, the n-type amorphous silicon hydride (n-a-Si: H) of the thin film semiconductor layer 6 is removed by having the source electrode 7s and the drain electrode 7d of the TFT as the mask. Then, 150 nm of silicon nitride (SiNx) is deposited as a protection insulating film 14, and a through-hole 8 for connecting the pixel electrode 5 is formed in a part of the silicon nitride. Further, 40 nm of ITO is deposited thereon as a second transparent electrode, and a pattern of the pixel electrode 5 is formed on the ITO. The pixel electrode 5 is in a form in which a striped pattern is connected at both ends 9. The width of the striped electrode is set as 3 μm, and the width of the slit between the electrodes in a striped form is set as 6 μm. In a region II that is the upper half part of the pixel, the striped electrode is extended in the direction rotated counterclockwise by 8 degrees from the horizontal direction (extending direction of the scan line 3), and the striped electrode is extended in the direction orthogonal thereto in the lower half part of the region, of the pixel. A TFT array substrate 28 is fabricated by the method, described above.

Further, a black matrix 17 is formed by using resin black on the transparent insulating substrate 21 constituted with the second glass substrate. A color layer 18 of RGB (red, green, and blue) is formed thereon in a prescribed pattern, and an overcoat layer 19 is formed thereon. An alignment film 11 that can be aligned by irradiating polarized light, is formed thereon, and photoalignment processing is performed so as to form a region I and a region II shown in FIG. 4 where initial alignment directions 29 and 31 are orthogonal to each other.

Reactive mesogen having a reactive group at the end of the liquid crystal, molecules is applied to the whole surface thereof, UV (ultra violet) is irradiated to the entire display part, the peripheral part thereof. Is remained as unexposed, the unexposed part is removed by a developing solution, and exposure/calcination is performed further to form a layer (a first, optical compensation layer). i.e., an in-cell retarder 10, which exhibits the uniaxial optical anisotropy in which the alignment is set in the direction shown in FIG. 4. Note here that the extent of the retardation of the in-cell retarder 10 is set as 150 nm. Through the method described above, a color filter substrate 30 is fabricated.

Alignment films 15 and 16 that can be aligned by irradiating light are formed on both of the TFT array substrate 28 and the color filter substrate 30 formed in the manner described above, and photoalignment processing is performed, to form the region I and the region II shown in FIG. 4. At this time, the anisotropic axis of the in-cell retarder 10 and the initial alignment directions 29, 31 of the liquid, crystal 12 are set to be the same in each of the region I and the region II. In the region II where the striped pixel electrode 5 is extended in the direction rotated counterclockwise by 8 degrees from the horizontal direction (the extending direction of the scan line 3) in the upper half part of FIG. 4, the initial alignment direction 31 is set in the horizontal direction. At this time, the pretilt angle is set as 0 degree in both of the TFT array substrate 28 and the color filter substrate 30. Further, in the region I where the striped pixel electrode 5 is extended in the direction rotated counterclockwise by 8 degrees from the longitudinal direction (the direction orthogonal to the extending direction of the scan line 3) in the lower half part of FIG. 4, the initial alignment direction 29 is set in the longitudinal direction. At this tune, the pretilt angle is set as 0 degree in both of the TFT array substrate 28 and the color filter substrate 30.

Note here that the angles are so set mat the initial alignment direction 31 of the region II in the upper half part of FIG. 4 and the initial alignment direction 29 in the lower half part, become orthogonal to each other. Further, the area of the region I and the area of the region II are set to be almost, equivalent. This makes it easier to mutually compensate the region I and the region II with each other, so that it is possible to acquire a fine viewing angle property with fine symmetry as well as less fluctuation and coloring caused by the viewing angle in the voltage-luminance property.

Further, a seal material is applied to the TFT substrate 28 and the color filter substrate 30 to laminate those to each other, and the liquid crystal 12 exhibiting positive permittivity anisotropy is inserted and sealed. Note here that the property value of the liquid crystal 12 is set as $\Delta\epsilon=5.5$, $\Delta n=0.100$, and the height of the columnar spacer is controlled so that the thickness d of the liquid crystal layer 12a becomes 4.0 μm. At this time, retardation of the liquid crystal layer 12a is given by the product of $\Delta n$ and d, which is set as 400 nm. This value is set to be a slightly larger value than ½ of 550 nm that is the main wavelength of the green light. With such value, the layer thickness deff with which the liquid crystal 12 moves effectively becomes about 270 to 300 nm, thereby providing a fine display. The reason that the layer thickness becomes about 270 to 300 nm is that the lateral electric field constituted by the fringe field becomes stronger on the substrate 20 side which constitutes the electrode and weaker on the opposing substrate 21 side, so that the liquid crystal 12 on the substrate 20 side moves mainly while the liquid crystal 12 on the substrate 21 side moves only for small amount.

The retardation 150 nm of the in-cell retarder 10 that is the layer exhibiting the uniaxial optical anisotropy formed by using the reactive mesogen and the retardation 40 nm of the liquid crystal, layer 12a are in the same direction, which become the retardation of 550 nm in total. Thus, at 550 nm that is the typical wavelength of green as the center of the visible light region, the abnormal light comes to have the retardation of almost the same length as the wavelength of the normal light.

In the meantime, polarization plates 22, 23 are laminated on the outside of the substrates 20, 21 on both sides in such a manner that the polarization axes thereof become orthogonal to each other. Note here that the direction of the absorption axis 26 of the polarization plate 22 on the TFT array substrate 28 side is set as the same as the initial alignment direction 29 of the region I. Between the polarization plate 23 and the substrate 21 on the color filter substrate 30 side, the second optical compensation layer (outside A-plate 24) exhibiting the uniaxial refractive index anisotropy in the direction in parallel to the in-plane in the direction orthogonal to the initial alignment direction 29 of the region I and the third optical compensation layer (C-plate 25) exhibiting the uniaxial refractive index anisotropy in the direction orthogonal the substrate 21 are disposed in this order from the substrate 21 side.

At this time, a TAC (triacetylcellulose) layer 33 is used as a substrate for supporting the outside A-plate 24 and the C-plate 25. For the TAC layer 33, used is a type exhibiting negative uniaxial anisotropy in the direction perpendicular to the substrate 21. In the explanations provided hereinafter, the retardation of the TAC layer 33 together with the retardation of the C-plate 25 is described as the retardation of the C-plate 25. In the first exemplary embodiment, the retardation of the outside A-plate 24 disposed between the substrate 21 and the exit-side polarization plate 23 is set as 128 nm, and the retardation of the C-plate 25 is set as 68 nm.

Through loading a backlight and a driving circuit to the liquid crystal display panel fabricated in the manner described above, the active-matrix type liquid crystal, display device of the first exemplary embodiment can be completed. FIG. 3 shows an incident direction 60 of the backlight.

In the liquid crystal display device acquired in the manner described above, the liquid crystal 12 is rotated clockwise in both of the region I and the region II when an electric field is applied between the pixel electrode 5 and the common electrode 1. In the region I and the region. II, the initial alignment directions 29 and 31 of the liquid crystal 12 are orthogonal to each other, and the angles formed between the initial alignment directions 29, 31 and the electric field are almost equivalent. Thus, the liquid crystal 12 in the region I and the liquid crystal 12 in the region II are rotated while keeping the state of being orthogonal to each other. Therefore, shift of the voltage-transmittance property as the issue in each of the region I and the region II alone described by using FIG. 25 and FIG. 26 can be suppressed dramatically since the viewing angle properties compensate with each other by designing the both regions to have a same-sized area. Next, described is a case of displaying black by using the initial alignment state of the liquid crystal 12. In both of the region I and the region II, the absorption axis 26 of the incident-side polarization plate 22 and the absorption axis 27 of the exit-side polarization plate 23 are orthogonal to each other, and the liquid crystal 12a, the in-cell retarder 10 which is the optical compensation layer, the A-plate 24, and the C-plate 25 sandwiched therebetween are in parallel to either one of the absorption axes 26 and 27 or orthogonal to the substrates 20, 21. Therefore, the transmittance is suppressed to be low when viewing the display surface from the front, so that a fine black display can be acquired.

Next, there is considered a case of viewing from the oblique view field in the direction making an angle of 45 degrees with respect to the absorption axes 26, 27 of the both polarization plates 22, 23. It is defined here that the unit vector in the direction of the absorption axis 26 of the incident-side polarization plate 22 is p, the unit vector of the absorption axis 27 of the exit-side polarization plate 23 is a, the direction of the director of the region I is n1, the unit vector of the director of the region II is n2, the direction of the optical axis, of the outside A-plate 24 placed between, the exit-side polarization plate 23 and the substrate 21 is ap, the direction of the C-plate 25 is cp, and the direction of the light ray is s.

The followings can be acquired provided that the transmission axis of the incident-die polarization plate 22 in the direction perpendicular to the light ray s is p', the transmission axis of the exit-side polarization plate 23 is a', the direction of the axis of the normal light of the director of the region I is n1', the direction of the axis of the normal light of the director of the region II is n2', the direction of the axis of the normal light of the A-plate 24 is ap', and the direction of the axis of the normal light of the C-plate is cp'.

$$p' = p \times s$$

$$a' = a \times s$$

$$n1' = n1 \times s$$

$$n2' = n2 \times s$$

$$ap' = ap \times s$$

$$cp' = cp \times s$$

First, in the region I, the polarization axis of the light transmitted, through the incident-side polarization plate 22 becomes the direction of p'. It is the same as the direction of the liquid crystal layer 12a and the normal light of the in-cell retarder 10 since p=n1 and p'=n1', so that the light transmits through the liquid crystal layer 12a as it is. Subsequently, the light is subjected, to the retardation by ap' when transmitting through the A-plate 24, and further subjected to the retardation by cp' when transmitting through the C-plate 25. As a result, the polarization axis of the direction of p' is rotated to the direction of a polarization axis pp1' that is orthogonal to the transmission axis a' of the exit-side polarization plate 23. Thereby, the light transmitting through the exit-side polarization plate 23 is being absorbed. Thus, the transmittance can be suppressed to be low, so that a fine black display can be achieved. This is the same principle as that of the related technique 2 with which, the optical compensation layer suppresses the light leakage of the black display from the oblique view field.

In the meantime, the polarization axis of the light transmitted through the incident-side polarization plate 22 also becomes the direction of p' in the region II. Note here that the direction of n2 of the director of the region II is perpendicular to p, so that n2' and p' are not the same. Thus, the polarization axis of the polarization light transmitted through the incident-side polarization plate 22 is changed by the retardation of the liquid crystal 12 when transmitting through the liquid crystal, layer 12a.

When the retardation of the liquid crystal layer 12a corresponds to λ/2 and there is no in-cell retarder, the light passed through, the liquid crystal layer 12a is changed to the direction p" that is symmetric to n2'. The light subsequently passing through the A-plate 24 is subjected to the retardation by ap', and further subjected to retardation by cp' when passing through the C-plate 25. As a result, the polarized light in the direction of p" is rotated in the direction of pp2'. Since pp2' becomes inversely away from the direction orthogonal to a', the optical compensation of the A-plate 24 and the C-plate 25 brings about a contrary effect. Thus, the transmittance of black from the oblique view field is increased, so that a fine black, display cannot be acquired.

The retardation of a case of white display is proper to be about 300 to 400 nm. Thus, it is not possible to acquire a fine black display from the oblique view field only with the retardation of the liquid crystal layer as in the case of the related technique 2 since the case only with the liquid crystal layer is similar to the above-described condition.

In the meantime, the in-cell retarder 10 exhibiting the uniaxial optical, anisotropy in the same direction as that of the liquid crystal layer 12a is disposed within the liquid crystal cell, as in the case of the first exemplary embodiment. Thereby, in addition, to the retardation 300 to 400 nm of the liquid crystal layer 12a required for acquiring the white display, the total retardation of the liquid crystal layer 12a and the in-cell retarder 10 can be increased to 500 to 600 nm. As a result, in the vicinity of 550 nm that is the typical wavelength, of green as the center of the visible light region, the abnormal light comes to have the retardation almost the same length as the wavelength of the normal light. Therefore, the abnormal light transmitted therethrough is subjected to the retardation of one wavelength with respect to the normal light, so that the polarization direction is returned to almost the direction of p'.

Therefore, the light passing through the A-plate 24 and the C-plate 25 disposed between the exit-side polarization, plate 23 and the substrate 21 is rotated in the direction of pp1' as in the case of the region I. Thus, the light is absorbed by the exit-side polarization plate 23, so that the transmittance is suppressed to be low. The retardation becomes larger than the wavelength with the wavelength of blue, and the retardation becomes smaller than the wavelength with the wavelength of red. Therefore, the transmittance as a whole is suppressed to be low, while it is slightly increased compared, to the case of the region I.

Figure 6A:
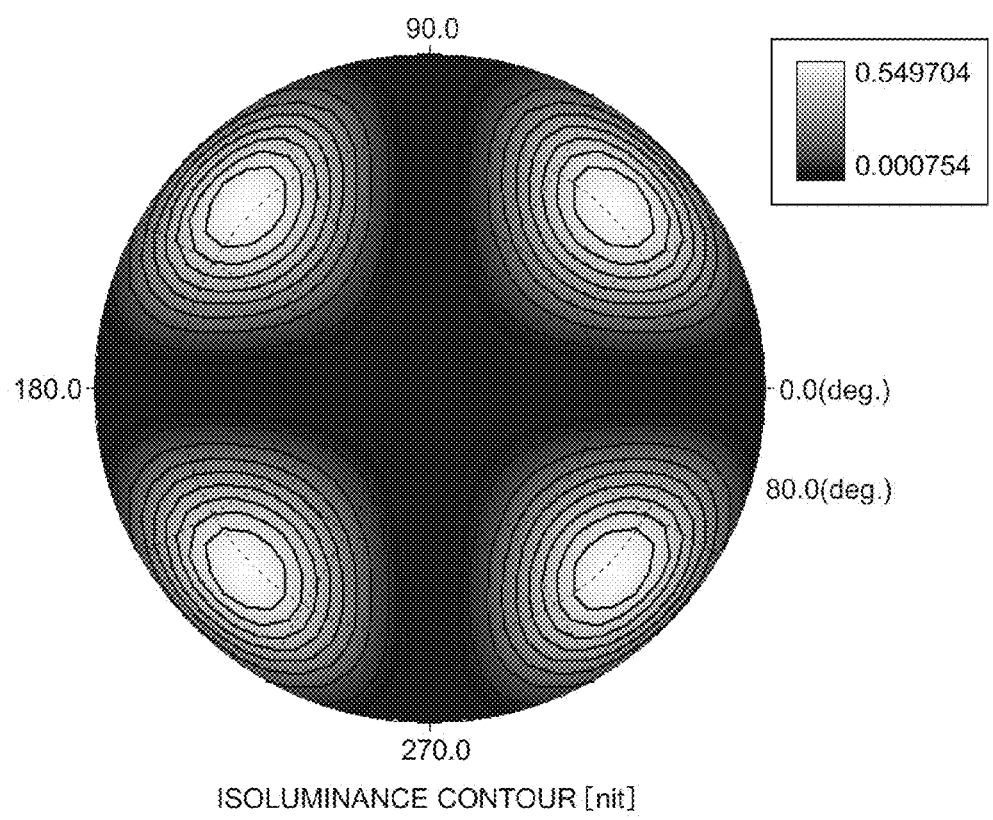
FIG. 6A is an illustration of the viewing angle property of black display in a region II in the liquid crystal display device according to the first exemplary embodiment, which is compared with that of the related technique.
Figure 6B:
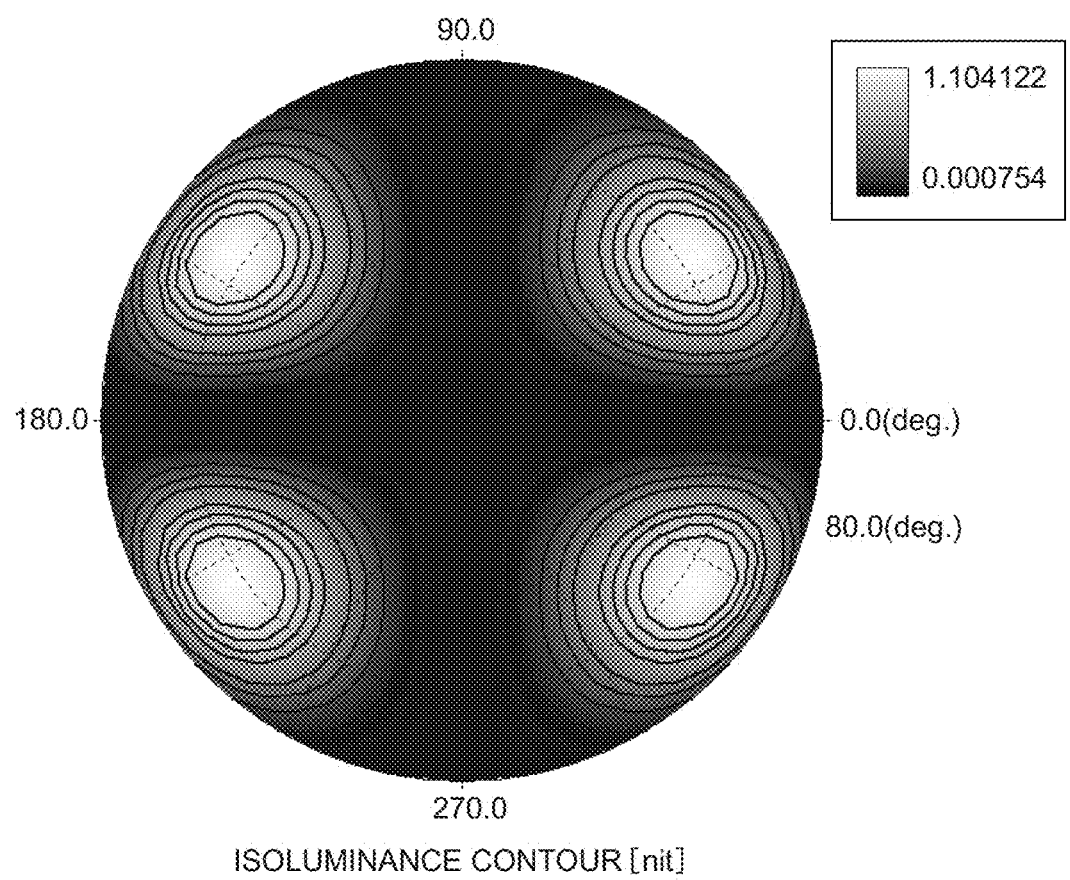
FIG. 6B is an illustration of the viewing angle property of black display in the region II in the liquid crystal display device according to the first exemplary embodiment, which is compared with mat of the related technique.

FIG. 6A shows the viewing angle property of the black display in the region II in the case where the in-cell retarder, the outside A-plate, and the C-plate are not disposed. FIG. 6B shows the viewing angle property of the black display in the region II in the case where only the outside A-plate and the C-plate are disposed. The both show the isoluminance distribution of the black display when designating the azimuth angle (0 to 360 degrees) and the polar angle (0 to 80 degrees) of the viewing angles in the case where the initial alignment direction of the liquid crystal in the region I is set as 90 degrees. The maximum black luminance of the oblique view field is about 0.56 cd/m² in FIG. 6A, while the maximum black luminance of the oblique view field in FIG. 6B is about 1.1 cd/m².

Figure 6C:
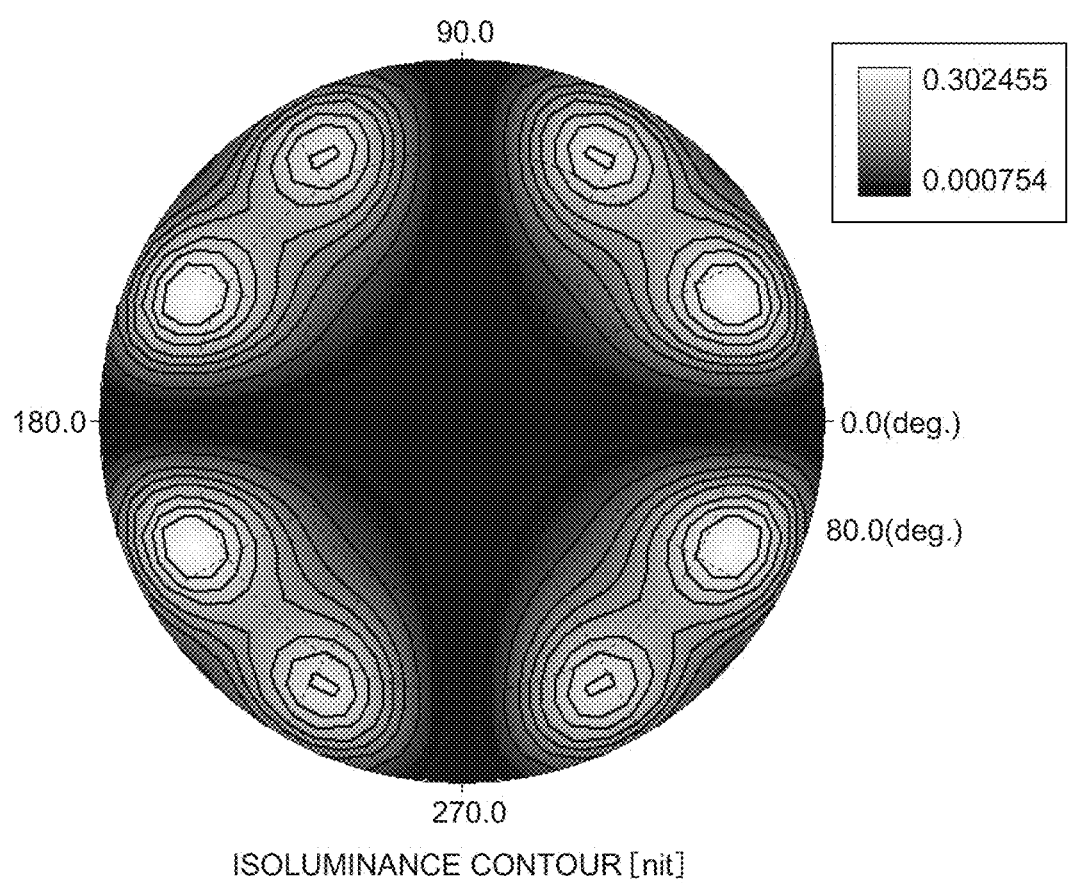
FIG. 6C is an illustration of the viewing angle property of black display in the region II in the liquid crystal display device according to the first exemplary embodiment, which is compared with that of the related technique.

Through disposing the outside A-plate 24 and the C-plate 25, it is possible to improve the black viewing angle property dramatically in the region I. In the meantime, in the region II, the viewing angle property is deteriorated inversely when the outside A-plate 24 and the C-plate 25 are disposed in a state where the in-cell retarder 10 is not disposed. FIG. 6C shows the black viewing angle property of the region. II when the in-cell retarder 10 as in the case of the first exemplary embodiment is disposed. With the retardation of 550 nm acquired by adding up the retardation of the liquid crystal layer 12a and that of the in-cell retarder 10 as in this case, it is possible to improve the viewing angle property of the black display dramatically and to make the maximum black luminance of the oblique view field as 0.30 cd/m².

Figure 7A:
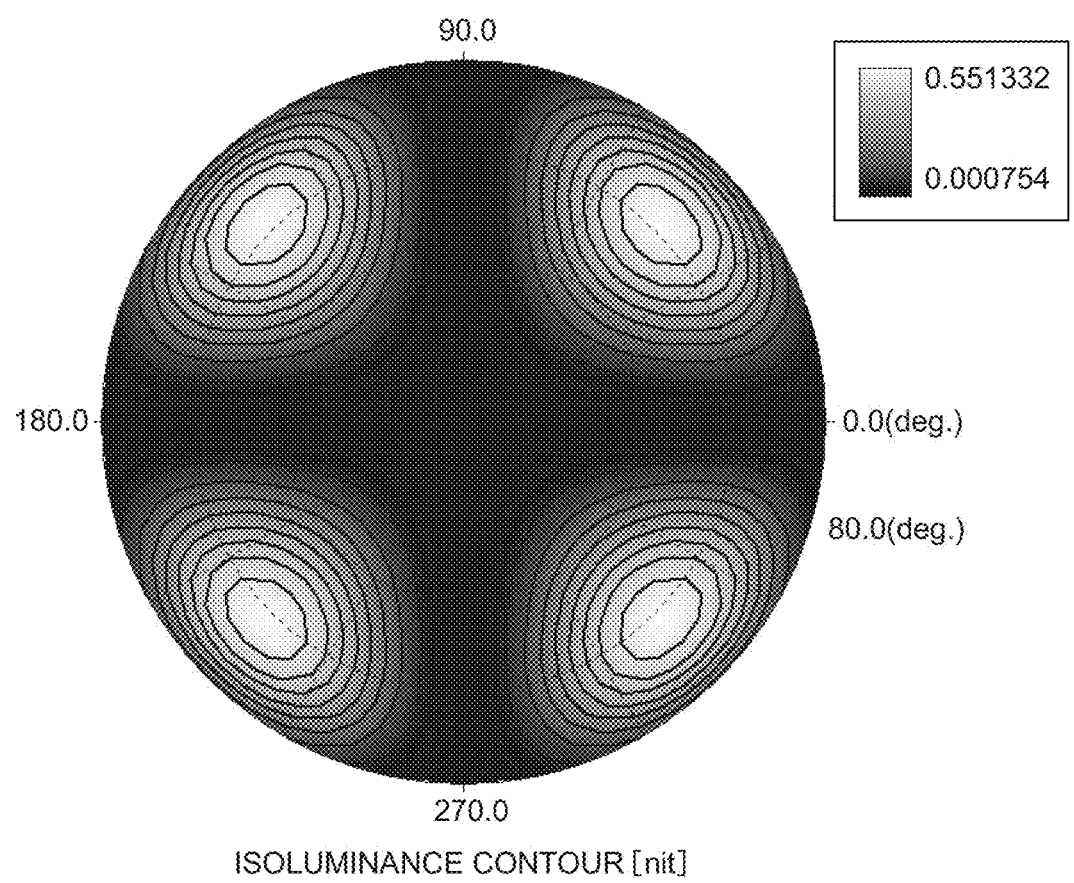
FIG. 7A is an illustration of the viewing angle property of black display in the liquid crystal display device according to the first exemplary embodiment, which is compared with that of the related technique.
Figure 7B:
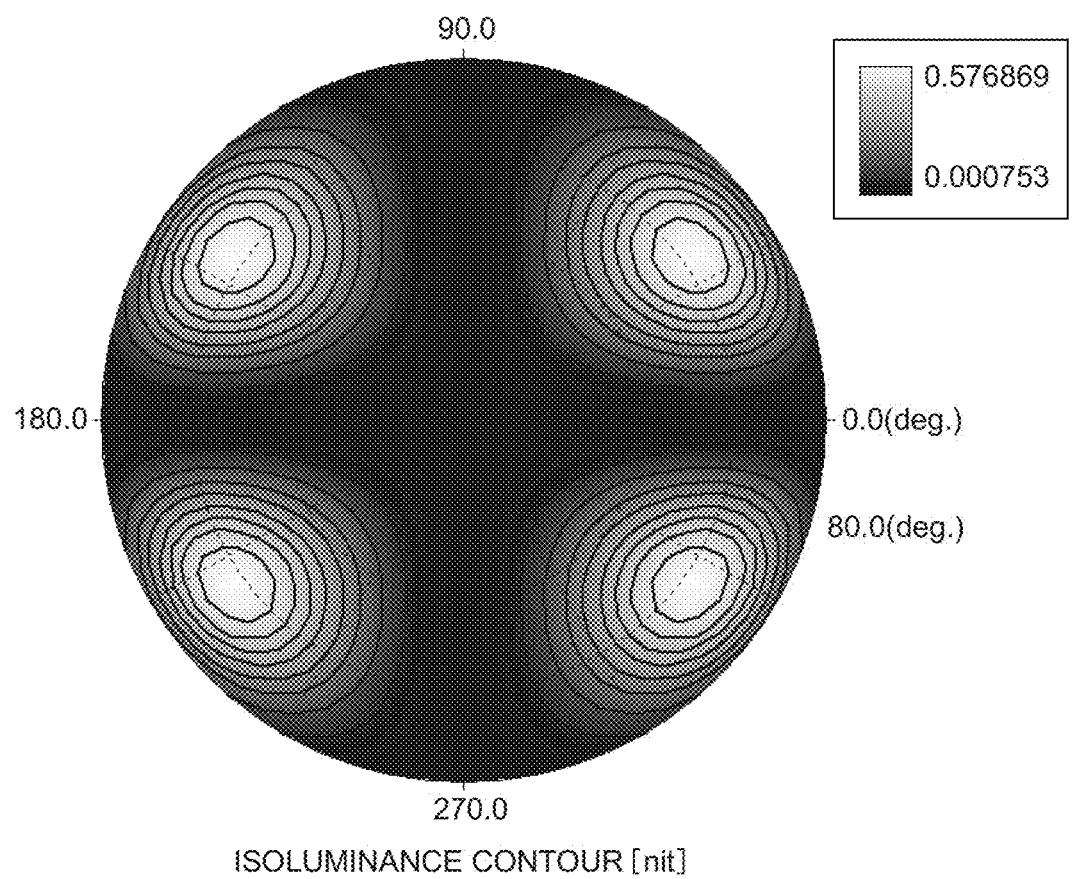
FIG. 7B is an illustration of the viewing angle property of black display in the liquid crystal display device according to the first exemplary embodiment, which is compared with that of the related technique.
Figure 7C:
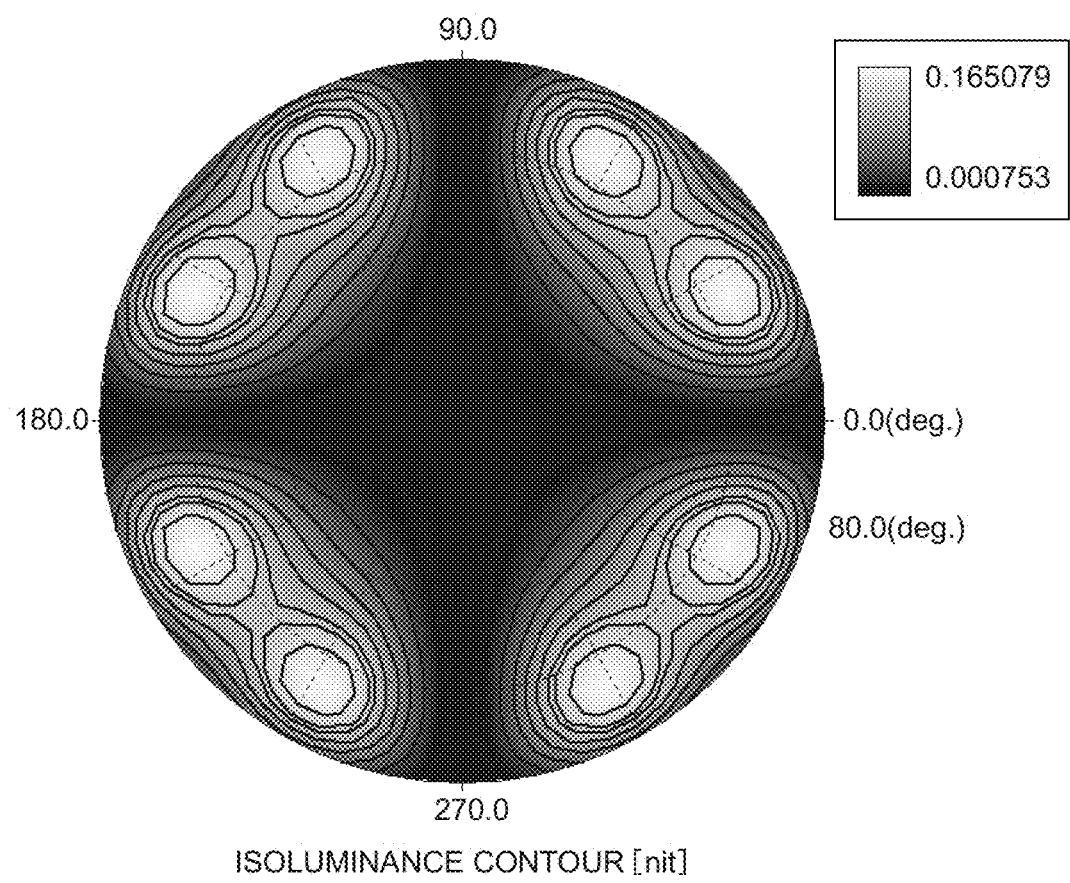
FIG. 7C is an illustration of the viewing angle property of black display in the liquid crystal display device according to the first, exemplary embodiment, which is compared with that of the related technique.

In the actual, pixel, each, of the region I and the region II is constituted with a ½ part. Thus, the transmittance from the oblique view field at the time of the black display is acquired by an average of the region I and the region II. FIG. 7A shows the viewing angle property of the black display in the case where the outside A-plate 24, the C-plate 25, and the in-cell retarder 10 are not disposed between the substrate 21 and the polarization plate 23. FIG. 7B shows the viewing angle property of the black display in the case where only the outside A-plate 24 and the C-plate 25 are disposed between the substrate 21 and the polarization plate 23 without disposing the in-cell retarder 10. Further, FIG. 7C shows the viewing angle property of the black display in the liquid crystal display device having the structure of the first exemplary embodiment. As shown in FIG. 7A, FIG. 7B, and FIG. 7C, the maximum black luminance from the oblique view field is 0.56 cd/m² in FIG. 7A, 0.57 cd/m² in FIG. 7B, and 0.16 cd/m² in FIG. 7C, respectively. Therefore, it can be seen that a fine black display from the oblique view field can be acquired with the first exemplary embodiment.

The above-described property of the black luminance from the oblique, view field is the relative comparison of the viewing angle distributions of the black luminance in each of the optical, layouts, and a same backlight source is used therein. When the luminance and the like of the backlight vary, the absolute values of the luminance itself change even though there is no change in the relative relationship.

Since the initial alignment direction 29 of the region I and the initial alignment direction 31 of the region II are orthogonal to each, other, there is a part in the boundary between the region I and die region II where each of the initial alignment directions 29 and 31 changes by 90 degrees. The initial alignment direction of that, part faces towards the direction different, from the polarization axes of the polarization plates 22 and 23 at the time of the black display, thereby generating light leakages. Thus, it is desirable to shield the light in this part. In the first exemplary embodiment, the light is shielded by disposing the common signal, wiring 2 constituted with the first metal layer in this part. Thereby; only a necessary region can be light-shielded with high precision, so that a sufficient light shielding can be done without deteriorating the numerical aperture. Further, the potential of the nontransparent metal layer is equivalent to that of the common electrode 1, so that it is possible to acquire a fine display without giving an electric disturbance. While the nontransparent metal layer with the potential equivalent to that of the common electrode 1 is disposed on the TFT array substrate 28 side to suppress the light leakage, the same effect can also be acquired by setting the nontransparent metal layer to have the potential equivalent to that of the pixel electrode 5. Further, it is also possible to shield the light in the boundary part between the region I and the region II by providing die black matrix 17 on the color filter substrate 30 side.

Further, FIG. 4 shows a plan view of the regions I and II expanded to the part, between the neighboring pixels. As shown in FIG. 4, in the vicinity of the data line 4, the alignment direction is set in the same direction as that of the region I, i.e., the direction at an angle of 8 degrees with respect to the extending direction of the data line 4. Thereby, the movement of the liquid crystal 12 can be made smaller by the electric field generated in the lateral direction of the drawing, which is generated between the data line 4 and the pixel electrode 5. Thus, the width of the black matrix 17 that shields the light in the vicinity of the data line 4 on the color filter substrate 30 side can be reduced, so that a wider numerical, aperture can be acquired. In this case, a region aligned in the same direction as that of the region I exists in both sides of the region II. Thus, a light shielding layer constituted with the first metal layer is disposed by connecting to the common electrode 1. This makes it possible to acquire a display with a high numerical, aperture and a line contrast.

When dividing the alignment, by irradiation of light in the exemplary embodiment described above, it is difficult to divide the light irradiation region completely with a line. Thus, light irradiation, is performed by having an overlapped part of about 2 to 3 μm between the regions so as not to have any region in the pixel where the alignment is undone because the light is not irradiated. Thereby, there is no part within the pixel where the alignment is uncompleted. As a result, it is possible to achieve fine two-divided alignment.

While the angles between the striped, pixel electrode 5 and the initial alignment directions 29, 31 of the liquid crystal 12 are set as 8 degrees in each of the regions I and II in the above-described embodiment, it is possible to acquire an almost equivalent fine display by setting the angles within the range of 5 to 10 degrees. Further, in some cases, it is possible to acquire a lair display by setting the angles between 2 degrees and 20 degrees, both inclusive. As described, the initial alignment directions 29, 31 and the extending direction of the striped pixel electrode 5 can be designed as appropriate in accordance with the shape and the size of the pixel.

As an exemplary advantage according to the invention, it is possible to acquire a lateral electric field type liquid crystal display device having two regions where the liquid crystal alignments in the initial, alignment state are set to be orthogonal, with which a fine display can be acquired even when viewed from oblique view fields at the time of black display.

Second Exemplary Embodiment

Figure 8:
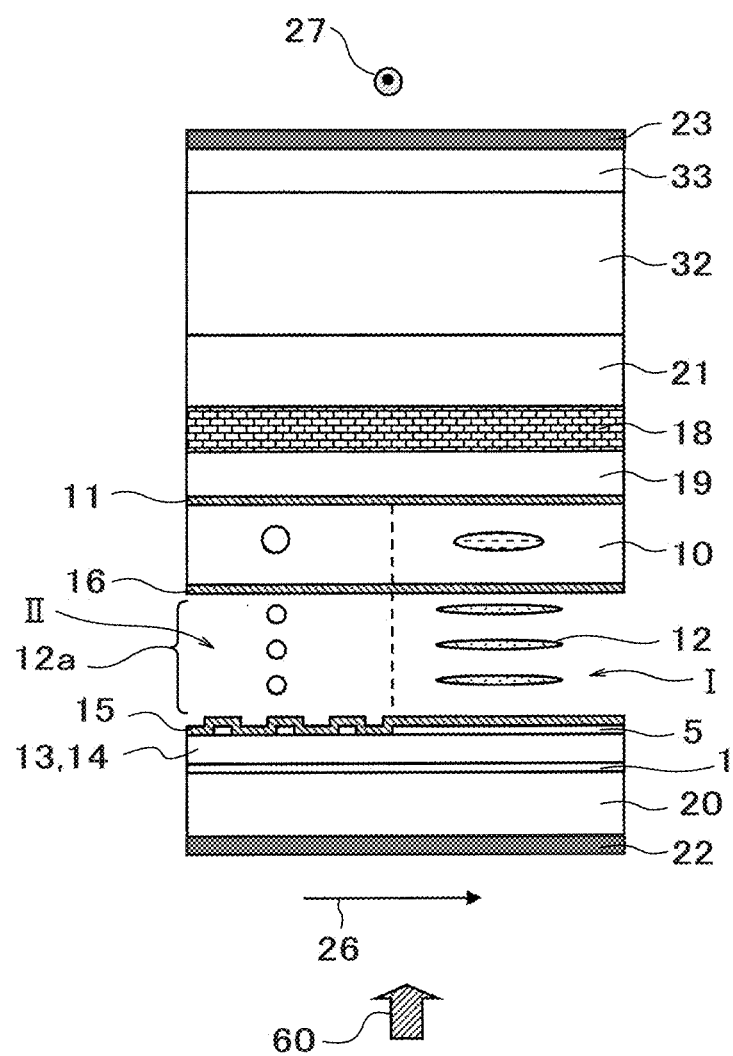
FIG. 8 is a sectional view showing a layout of optical elements in a liquid crystal display device according to a second exemplary embodiment.

A second exemplary embodiment, of the present invention will be described by referring to FIG. 8. In the first exemplary embodiment, as shown in FIG. 5, light leakages from the oblique view field are suppressed by disposing the outside A-plate 24 and the C-plate 25 in this order from the substrate 21 side between the exit-side polarization plate 23 and the substrate 21. The effects same as those of the phase compensation acquired by superimposing the outside A-plate 24 and the C-plate 25 can also be achieved by replacing this part with a biaxial compensation layer 32 that is a biaxial optical compensation layer as a fourth optical compensation layer as shown in FIG. 8. The TAC layer 33 as a supporting substrate is disposed between the biaxial compensation layer 32 and the polarization plate 23.

The TAC layer 33 exhibits negative retardation in the direction perpendicular to the substrate 21. Thus, an optical parameter exhibiting biaxial refractive index anisotropy almost equivalent to that of the first exemplary embodiment is found through a simulation by taking it into consideration, and the biaxial compensation layer 32 having the optical parameter based thereupon is disposed as shown in FIG. 8. The direction of the main axis of the biaxial compensation layer 32 is defined as the direction in parallel to the absorption axis 27 of the polarization plate 23 in the in-plane direction of the substrate 21, the direction perpendicular thereto, and the direction perpendicular to the substrate 21.

Figure 9:
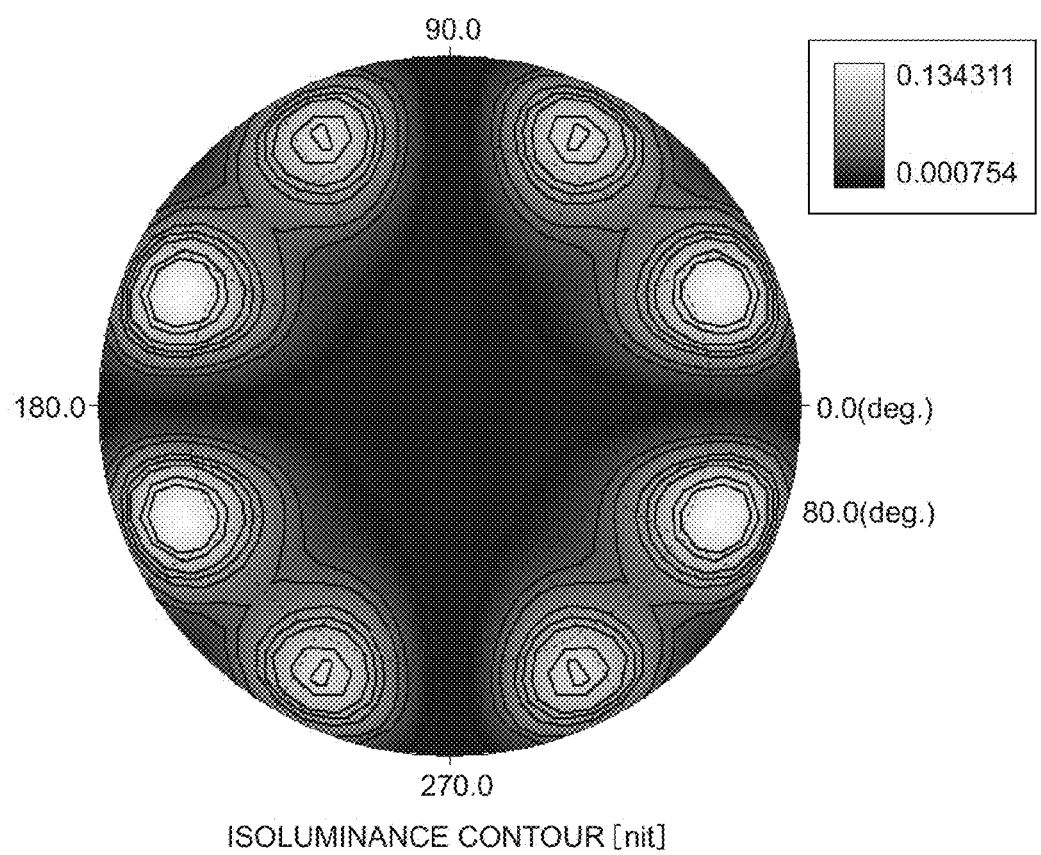
FIG. 9 is an illustration of the viewing angle property of black, display in the liquid crystal display device according to the second exemplary embodiment.

Thereby, as shown in FIG. 9, a fine black display viewing angle dependency can be acquired as in the case of the first exemplary embodiment. With the property of the second exemplary embodiment, the maximum luminance of the black display from the oblique view field becomes 0.13 cd/m² by using the backlight source same as that of the first exemplary embodiment, which is almost an equivalent property as the black display viewing angle property of the first exemplary embodiment shown in FIG. 7C.

Third Exemplary Embodiment

A third exemplary embodiment of the present invention will be described by referring to FIG. 10. In the first exemplary embodiment, as shown in FIG. 5, light leakages from the oblique view field are suppressed by disposing the outside A-plate 24 and the C-plate 25 in this order from the substrate 21 side between the exit-side polarization plate 23 and the substrate 21, in the third exemplary embodiment, the A-plate 24 as the outside second optical compensation layer and the C-plate 25 as the third optical compensation layer are disposed between the incident-side polarization pate 22 and the substrate 20.

As the order thereof, the C-plate 25 exhibiting the uniaxial anisotropy in the direction perpendicular to the substrate 20 is disposed from the incident-side polarization plate 22 side and, further, the outside A-plate 24 exhibiting the uniaxial refractive index anisotropy in the direction of the absorption axis 26 of the incident-side polarization plate 22 is disposed. As the amounts of the retardation of those plates, the respective same amounts as those of the first exemplary embodiment are employed.

In this case, when the light makes incident from the oblique direction, the polarized light of the light transmitted through the incident-side polarization plate 22 is directed towards the direction of p' as in the case of the first exemplary embodiment. Thereafter, the polarization direction of the light transmitted through the C-plate 25 and the outside A-plate 24 is rotated to the direction orthogonal to a'.

In the region II, the minor axis direction n2' of the refractive index anisotropy of the liquid crystal 12a and the in-cell retarder 10 matches a'. Thus, the polarization direction, of the light transmitted therethrough is not changed. Further, this polarization direction is the direction completely absorbed in the exit-side polarization plate 23, so that the transmittance can be suppressed to be low.

In the region I, the minor axis direction n1' of the refractive index anisotropy of the liquid crystal layer 12a and the in-cell retarder 10 matches p'. Thus, there is generated, retardation in the abnormal light direction orthogonal to the normal light direction that is the main axis direction thereof for the light transmitted therethrough. However, as in the case of the first exemplary embodiment, the retardation as the total of the liquid crystal layer 12a and the in-cell retarder 10 is set as 500 to 600 nm. Therefore, the abnormal light of the light transmitted therethrough is subjected to the retardation of one wavelength with respect to the normal light. As a result, the polarization direction is returned almost to the direction of p'.

Thus, through disposing the in-cell retarder 10, it is also possible to suppress the transmittance to be low and to acquire a fine black display from the oblique view field in the region I as well. The effect of the compensation is equivalent to the compensation of the black display from the oblique view field in the region II of the first exemplary embodiment.

In the actual pixel, each, of the region I and the region II is constituted with a ½ part. Thus, the transmittance from the oblique view field at the time of the black display is acquired by an average of the region I and the region II. Therefore, the optical layout of the third exemplary embodiment is equivalent to that of the first exemplary embodiment, so that a fine black display viewing angle property equivalent to that of the first exemplary embodiment, can be acquired.

Fourth Exemplary Embodiment

Figure 10:
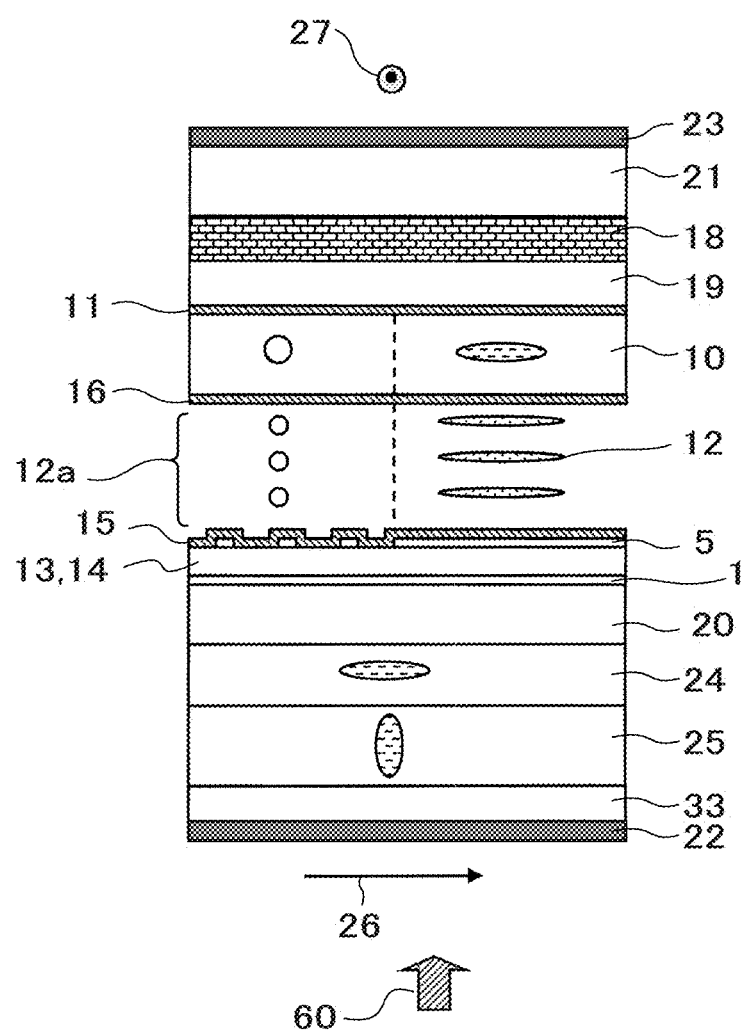
FIG. 10 is a sectional view showing a layout of optical elements in a liquid crystal display device according to a third exemplary embodiment.
Figure 11:
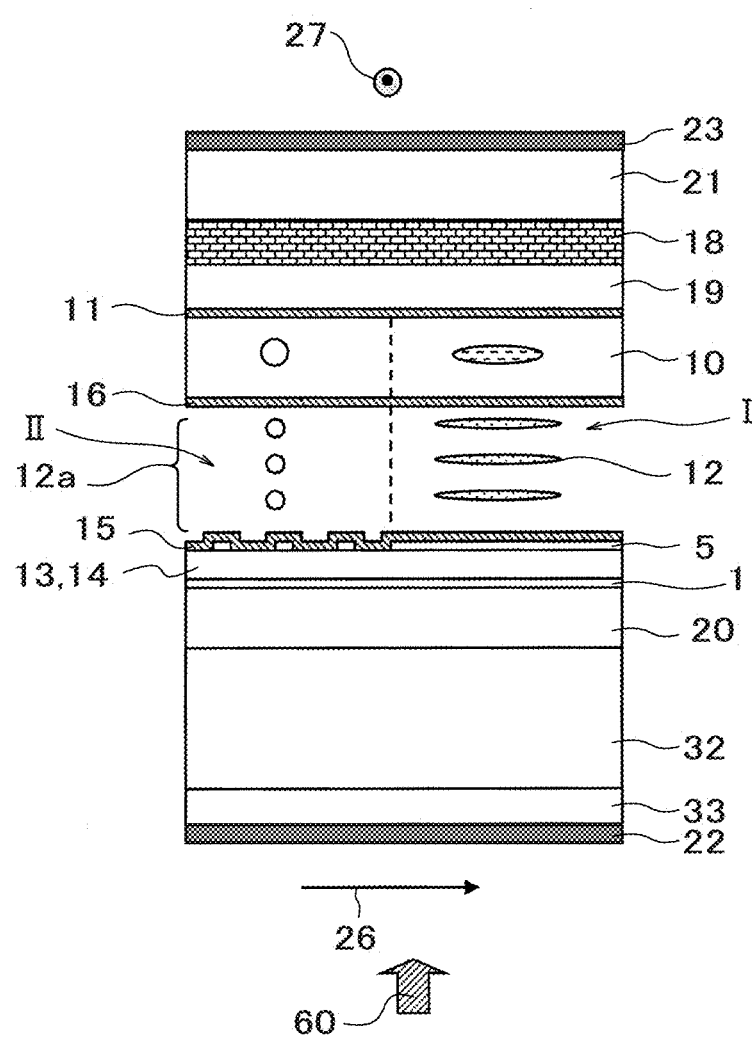
FIG. 11 is a sectional view showing a layout, of optical elements in a liquid crystal display device according to a fourth exemplary embodiment.

A fourth, exemplary embodiment of the present invention will be described by referring to FIG. 11, in the third exemplary embodiment, as shown in FIG. 10, light leakages from the oblique view field am suppressed by disposing the C-plate 25 and the outside A-plate 24 in this order from the incident-side polarization plate 22 side between the incident-side polarization plate 22 and the substrate 20. The effects same as the phase compensation acquired by superimposing the outside A-plate 24 and the C-plate 25 can also be achieved by replacing this part with the biaxial compensation layer 32 as shown in FIG. 11.

In the fourth, exemplary embodiment, the biaxial compensation, layer 32 of the same parameter as that of the second exemplary embodiment including the TAC layer 33 as the supporting substrate is disposed. The direction of the main axis of the biaxial compensation layer 32 is defined as the direction in parallel to the absorption axis 26 of the polarization plate 22 in the in-plane direction of the substrate 20, the direction perpendicular thereto, and the direction perpendicular to the substrate 20. Further, the direction of the main axis of the biaxial refractive index anisotropy is so defined that the relation with respect to the absorption axis 26 of the polarization plate 22 to be laminated therewith becomes the same.

The optical layout of the fourth exemplary embodiment is equivalent to that of the second exemplary embodiment, so that a fine black display viewing angle property equivalent to that of the second exemplary embodiment can be acquired.

Fifth Exemplary Embodiment

Figure 12:
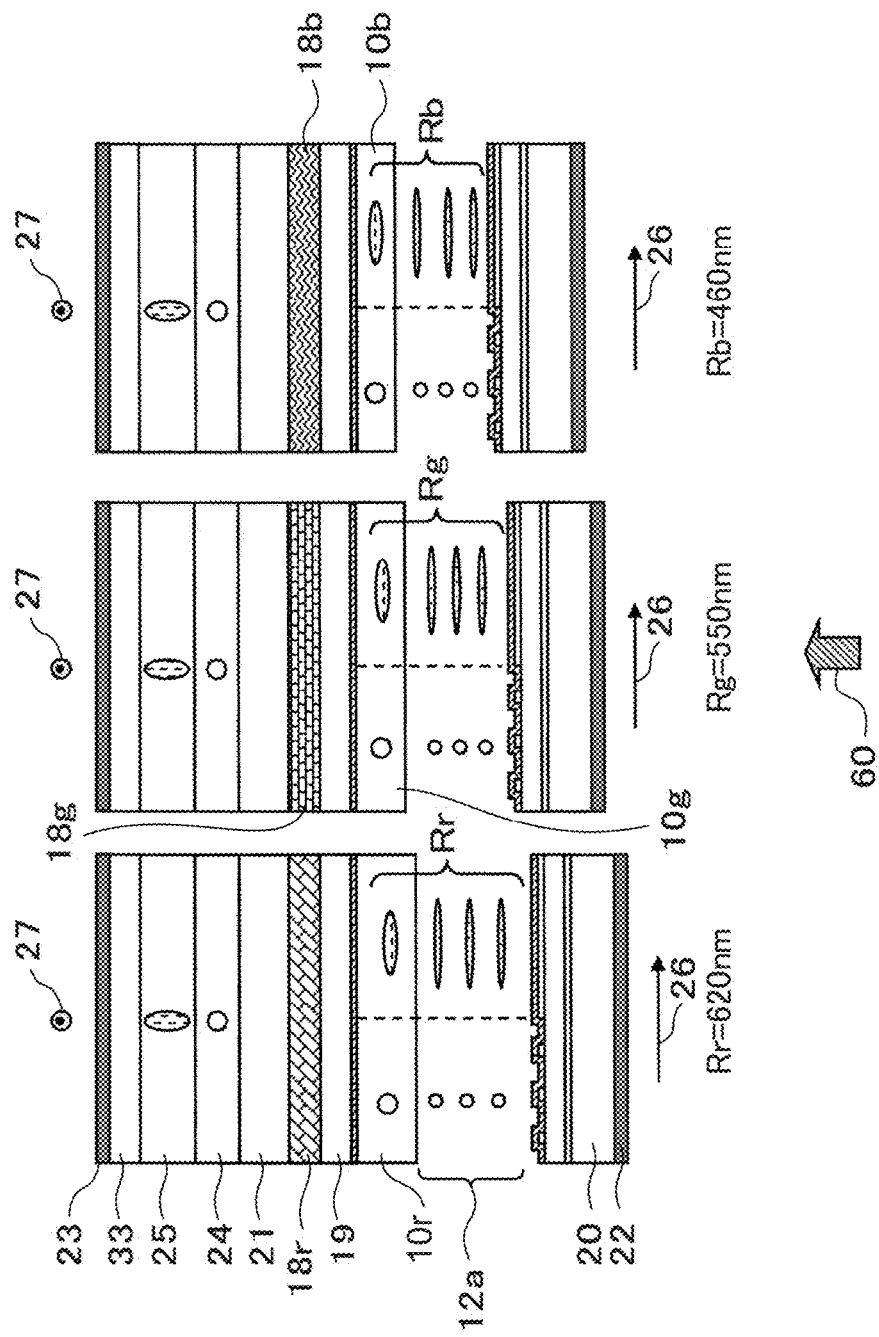
FIG. 12 is a sectional view showing a layout of optical elements in a liquid crystal display device according to a fifth exemplary embodiment.

A fifth exemplary embodiment of the present invention will be described by referring to FIG. 12. In the fifth exemplary embodiment, as in the case of the first exemplary embodiment, the outside A-plate 24 and the C-plate 25 are disposed in this order from the substrate 21 side between the exit-side polarization plate 23 and the substrate 21. Note, however, that the retardation amounts of in-cell retarders 10r, 10g, 10b as the first optical compensation layers are changed in the fifth exemplary embodiment for each of the sub-pixels which correspond to color layers 18r, 18g, 18b of the color filters of the respective three colors R, G, and B.

It is so defined that the retardation of the liquid crystal layer 12a is 400 nm, the retardation of the in-cell retarder 10r of the R sub-pixel is 220 nm, the retardation of the in-cell retarder 10g of the G sub-pixel is 150 nm, and the retardation of the in-cell retarder 10b of the B sub-pixel is 60 nm. Thereby, the total retardation Rr of the liquid crystal layer 12a and the in-cell retarder 10r of the R sub-pixel becomes 620 nm, the total retardation Gg of the liquid crystal layer 12a and the in-cell retarder 10g of the G sub-pixel becomes 550 nm, and the total retardation Bb of the liquid crystal layer 12a and the in-cell retarder 10b of the B sub-pixel becomes 460 nm.

As described, the total retardation of the liquid crystal layer 12a and the first optical compensation layer between the transparent insulating substrates 20 and 21 is set to be almost same as the wavelength selected from a range within 90% from the peak of the transmittance spectrum of each sub-pixel by changing the retardation amounts of the in-cell retarders 10r, 10g, and 10b, respectively, in each of the RGB sub-pixels.

With the first exemplary embodiment shown, in FIG. 5, a following phenomenon occurs. In the region II, the light passed through the incident-side polarization plate 22 comes to be in a state having the polarization axis in the direction of p'. Further, when the light passes through the liquid crystal, layer 12a and the in-cell retarder 10, it has the retardation of almost one wavelength with the wavelength of green. However, with the wavelengths of blue and red, the retardation is inconsistent with the wavelengths. Therefore, a slight light leakage occurs.

In the meantime, the sum of the retardation of the liquid crystal layer 12a and the retardation of each of the in-cell retarders 10r, 10g, 10b in each of the RGB sub-pixels matches the typical wavelength of each sub-pixel in the fifth exemplary embodiment, so that, the light leakages from the oblique view field can be suppressed more perfectly.

Figure 13A:
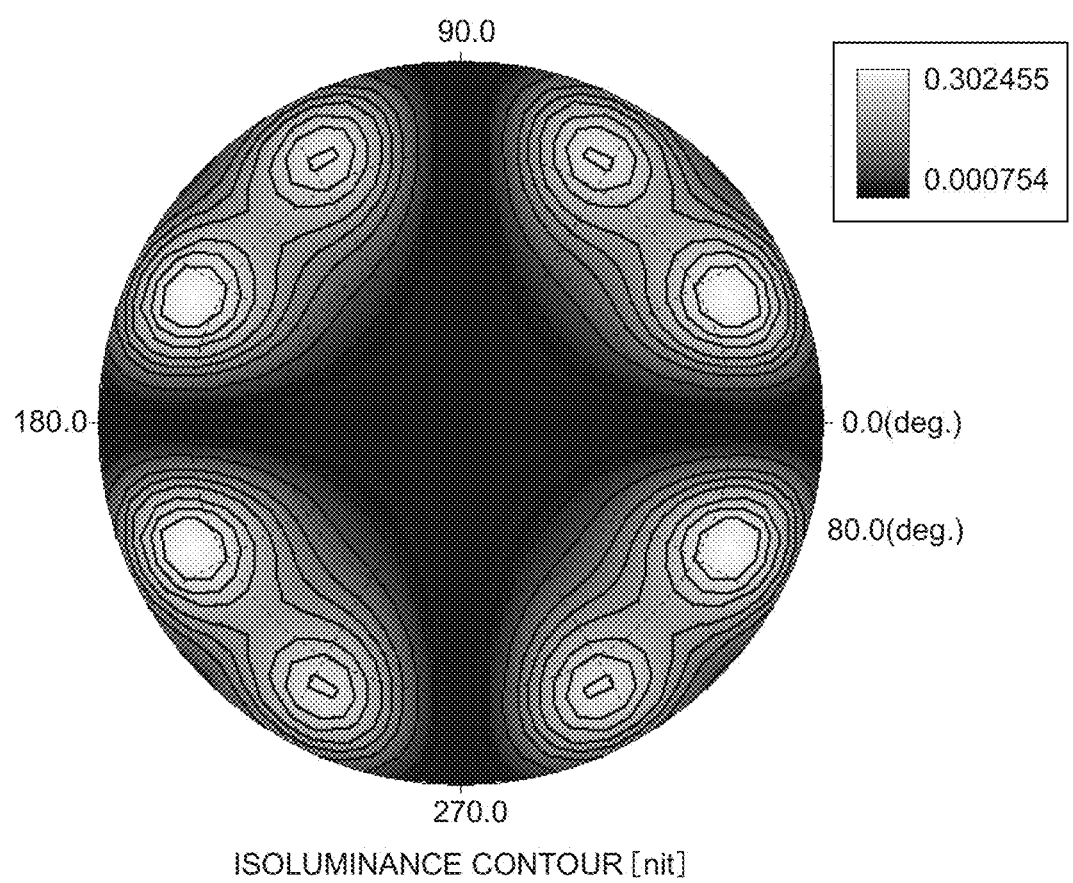
FIG. 13A is an illustration of the viewing angle property of black, display in a region II in the liquid crystal display device according to the fifth exemplary embodiment, which is compared with that of the first exemplary embodiment.
Figure 13B:
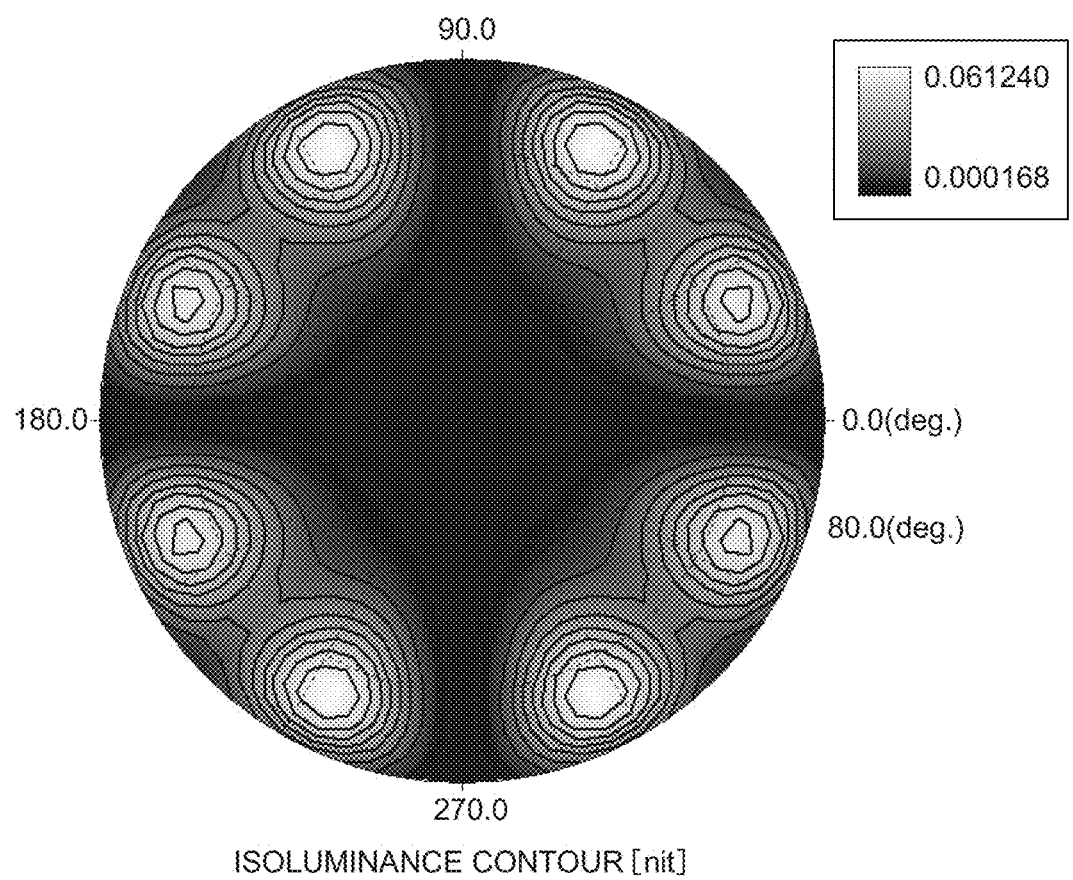
FIG. 13B is an illustration of the viewing angle property of black display in the region II in the liquid crystal display device according to the filth exemplary embodiment, which is compared with that of the first exemplary embodiment.

FIG. 13A shows the black display viewing angle property in the region II of a case (the first exemplary embodiment) where the retardation of the outside A-plate 24 between the substrate 21 and the exit-side polarization plate 23 is set as 128 nm and also that of the C-plate 25 is set as 68 nm to make the sum of the retardation of the liquid crystal layer 12a and that of the in-cell retarder 10 as 550 nm commonly in the RGB sub-pixels. Further, FIG. 13B shows the black display viewing angle property in the region II of a case (the fifth exemplary embodiment) where the total retardation with that of the liquid crystal layer 12a is changed for each of the RGB sub-pixels by setting the retardation of the in-cell retarders 10r, 10g, and 10b to be different from each other. While the maximum value of the black display from the oblique view field is about 0.30 cd/m² in FIG. 13A, the maximum value of the black display from the oblique view field is about 0.06 cd/m² in FIG. 13B. As described, herein, it is possible with the fifth exemplary embodiment to improve the black display viewing angle property in the region II further.

Figure 14:
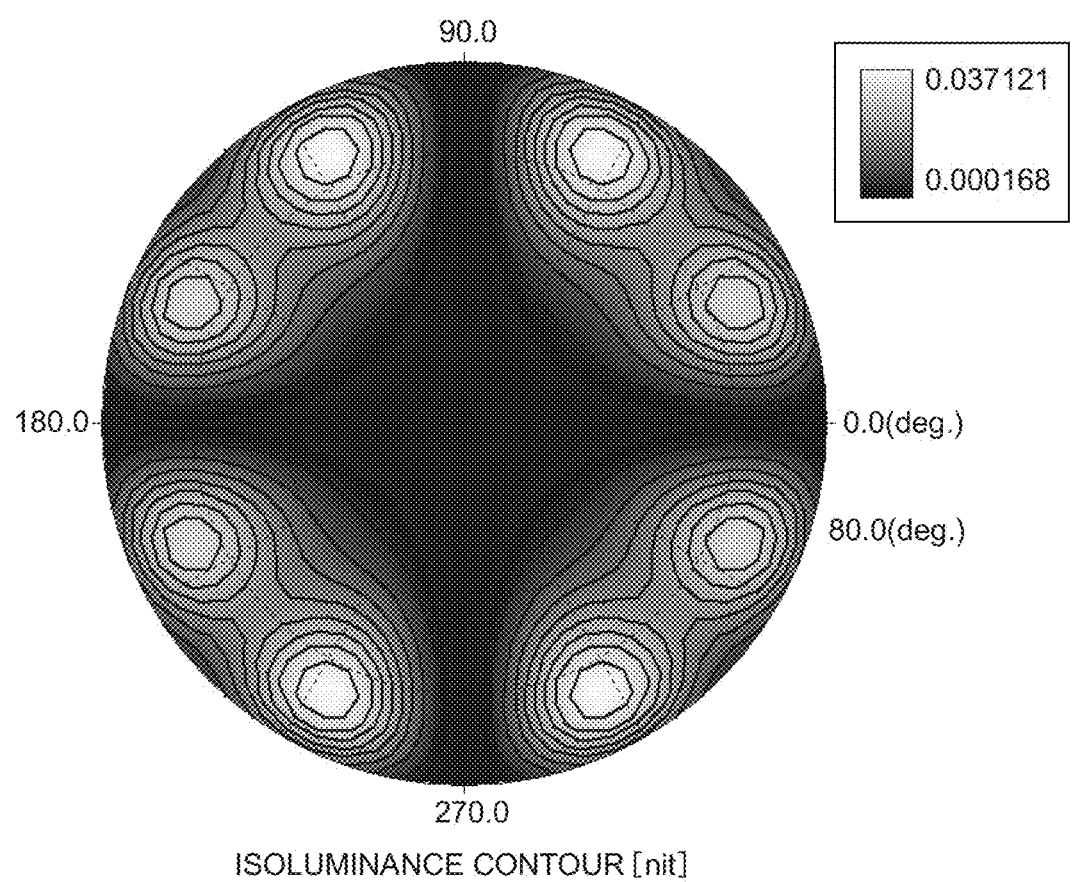
FIG. 14 is an illustration of the viewing angle property of black display in the liquid crystal display device according to the fifth exemplary embodiment, which is compared with that of the first exemplary embodiment.

Further, FIG. 14 shows the black display viewing angle property of a case of the fifth exemplary embodiment where a single sub-pixel is constituted with the region I and the region II of a ½ part each. In this case, the maximum, value of the black display from the oblique view field is about 0.04 cd/m². Thus, the viewing angle property at the time of the black display can be improved further compared, to the black display viewing angle property of the first exemplary embodiment shown in FIG. 7C.

For changing the total retardation of the liquid crystal layer and the in-cell retarder for each of the RGB sub-pixels, the thickness of the liquid crystal layer may be changed for R, G and B other than changing the retardation of the in-cell retarder for R, G and B as in the case of the fifth exemplary embodiment.

In the case of changing the thickness of the liquid crystal layer, the refractive index anisotropy Δn of the liquid crystal layer is set as 0.10, the thickness of the liquid crystal layer of the R sub-pixel, is set as 4.7 μm, the thickness of the liquid crystal, layer of the G sub-pixel is set as 4.0 μm, and the thickness of the liquid, crystal layer of the B sub-pixel is set as 3.1 μm, for example, and the retardation of the in-cell retarder is commonly set as 150 nm for the RGB sub-pixels. Thereby, the total retardation of each of the sub-pixels RGB becomes 620 nm in the R sub-pixel. 550 nm in the G sub-pixel, and 460 nm in the B sub-pixel.

Further, in the case of changing the retardation of the in-cell retarders, the refractive index anisotropy Δn of the liquid crystal layer of the RGB sub-pixels is set as 0.10, the thickness of the liquid crystal layer thereof is set as 3.5 μm for all, and the retardation of the in-cell retarders of the RGB sub-pixels is set as 270 nm, 200 nm, and 110 nm, respectively. Thereby, the total retardation of each of the RGB sub-pixels becomes 620 nm in the R sub-pixel, 550 nm in the G sub-pixel, and 460 nm in the B sub-pixel.

Sixth Exemplary Embodiment

Figure 15:
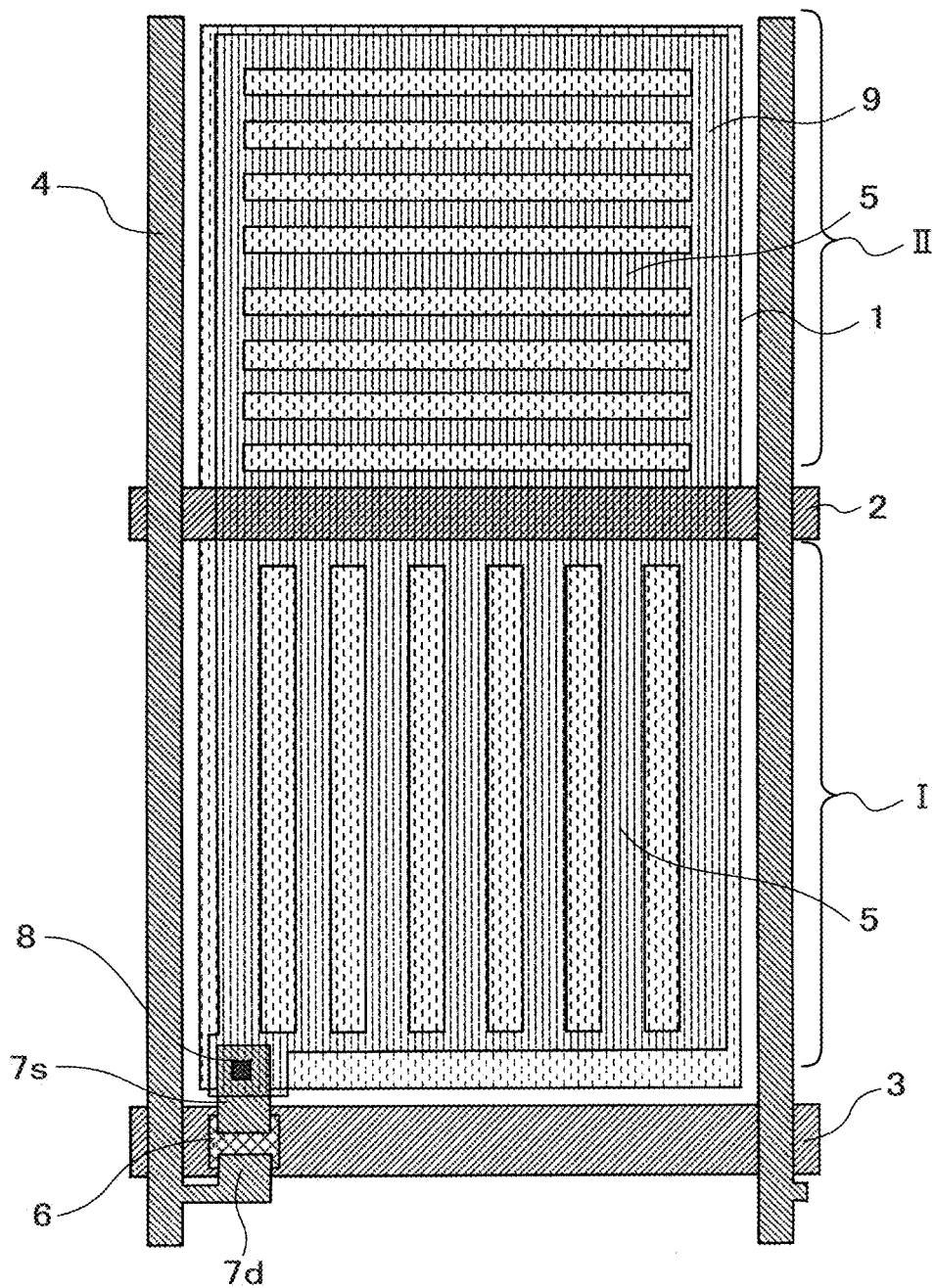
FIG. 15 is a plan view showing the structure of one pixel in a liquid crystal display device according to a sixth exemplary embodiment.
Figure 16:
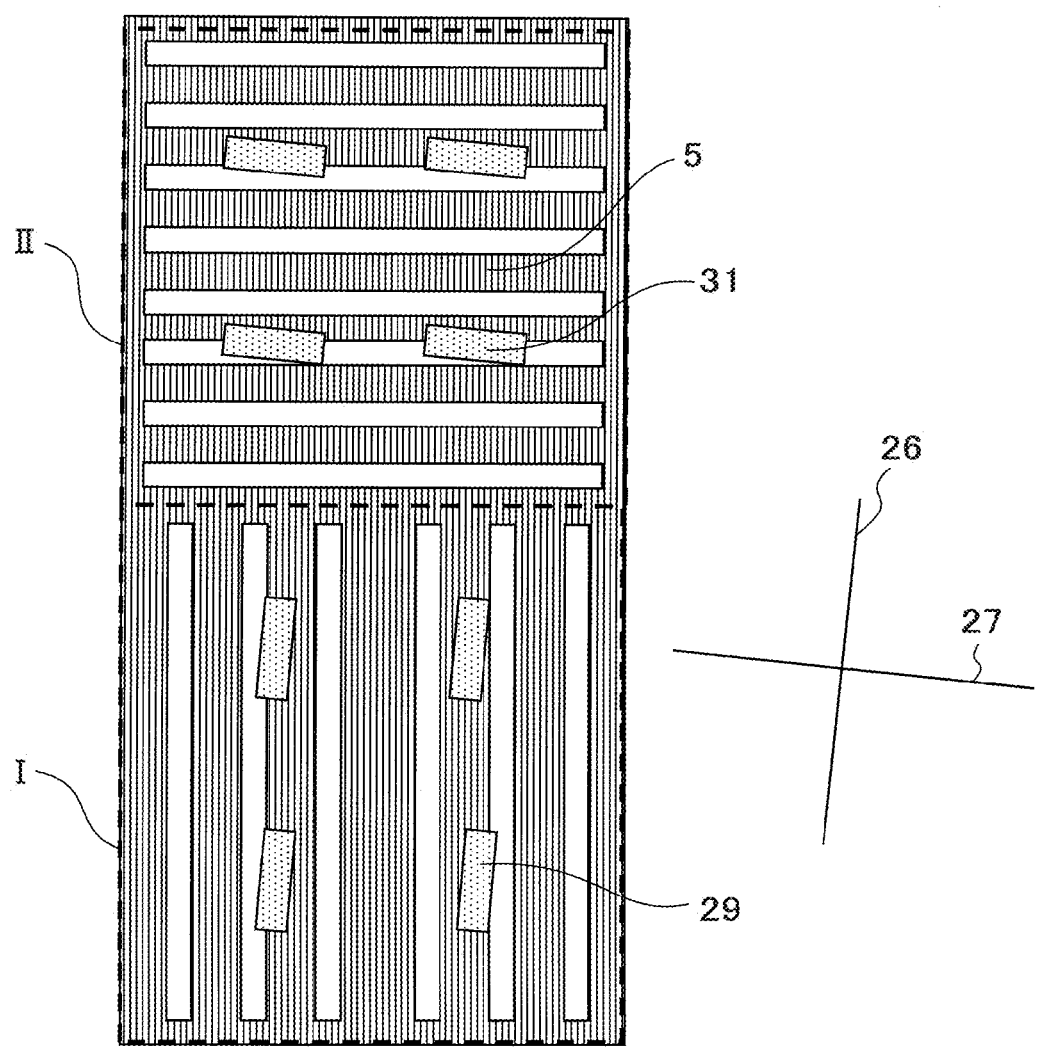
FIG. 16 is a plan view showing an alignment, state of one pixel in the liquid crystal display device according to the sixth exemplary embodiment.

A sixth exemplary embodiment of the present invention will be described by referring to FIG. 15 and FIG. 16. FIG. 15 is a plan view of one pixel. FIG. 16 shows division of the initial alignment direction in the display region, within one pixel. As shown in FIG. 15 and FIG. 16, in the sixth exemplary embodiment, only the extending direction of the striped electrode 5 and the initial alignment directions 29, 31 of the liquid crystal in the regions I and II are changed compared to the case of the first exemplary embodiment. In the region II that is the upper half part of the pixel, the striped electrode is extended in the horizontal direction (the extending direction of the scan line 3). Meanwhile, in the region I that is the lower half part of the pixel, the striped electrode is extended in the direction that is orthogonal thereto.

In the region II that is the upper half part of FIG. 16 where the striped electrode is extended in the horizontal direction (the extending direction of the scan line 3), the initial, alignment direction 31 is set in the direction rotated clockwise by 8 degrees from the horizontal direction. At this time, the pretilt angle is set as 0 degree in both of the TFT array substrate and the color filter substrate. Further, in the region I that, is the lower half part of FIG. 16 where the striped electrode is extended in the longitudinal direction (the direction orthogonal to the extending direction of the scan, line 3), the initial, alignment direction 29 is set in the direction rotated clockwise by 8 degrees from the longitudinal direction. At this time, the pretilt angle is set as 0 degree in both of the TFT array substrate and the color filter substrate. Note here that the angles are so set that the initial alignment direction 31 of the region II that is the upper half part of FIG. 16 becomes orthogonal to the initial alignment direction 29 of the region I that is the lower half part.

The other structures are the same as those of the first exemplary embodiment. The absorption axis of the incident-side polarization plate is set to be the same as the initial alignment direction 29 of the region I, and the absorption axis of the exit-side polarization plate is set to be orthogonal thereto. Further, the outside A-plate and the C-plate are disposed in this order from the substrate side between the polarization axis of the exit-side polarization plate and the substrate. The in-cell retarders are formed in each of the region I and II as in the case of the first exemplary embodiment, and the total, retardation of the liquid crystal, layer and the in-cell retarder is set as 550 nm.

In the case of this structure, the black display viewing angle property becomes the same as the property that is acquired by rotating the property in FIG. 7C clockwise by 8 degrees. Thus, a fine viewing angle property can be acquired. With the layout of such initial alignment directions 29 and 31, the optical elements shown in the second to fifth, exemplary embodiments can also be disposed. In this case, it is also possible to acquire the fine viewing angle properties acquired by rotating the black display viewing, angle properties of the second to fifth, exemplary embodiments clockwise by 8 degrees, respectively.

Seventh Exemplary Embodiment

Figure 17:
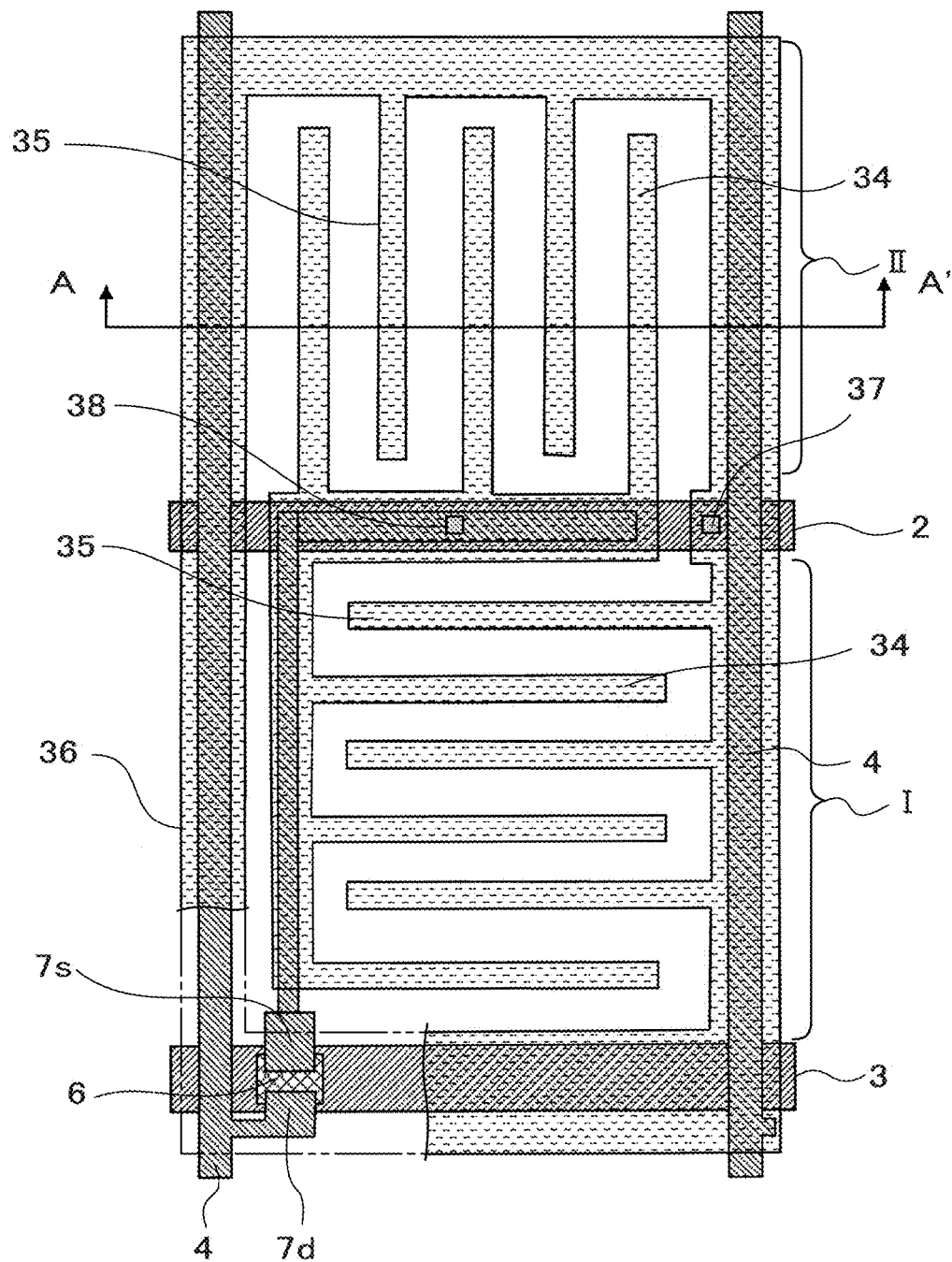
FIG. 17 is a plan view showing the structure of one pixel in a liquid crystal display device according to a seventh exemplary embodiment.
Figure 18:
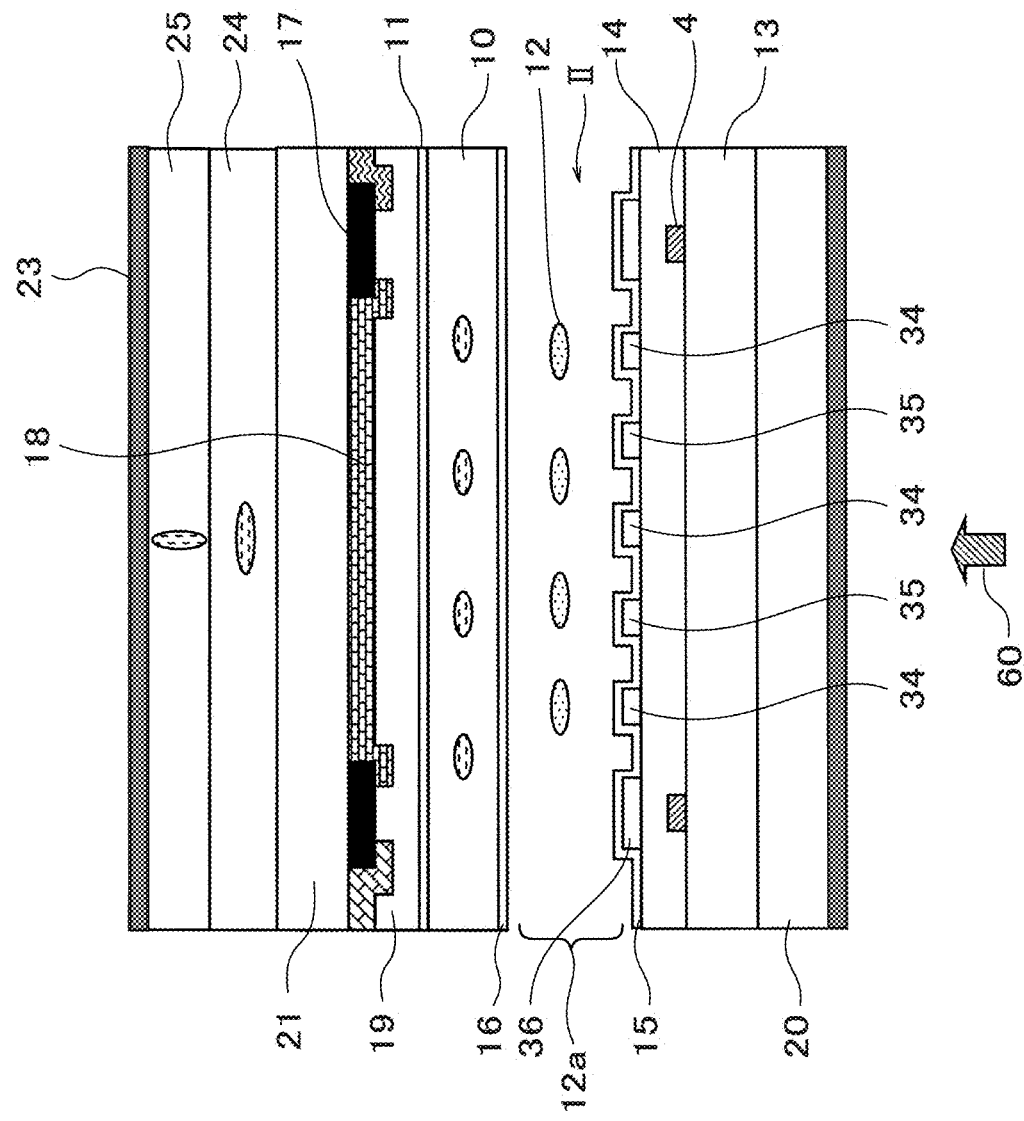
FIG. 18 is a sectional view taken along line A-A' of FIG. 17.
Figure 19:
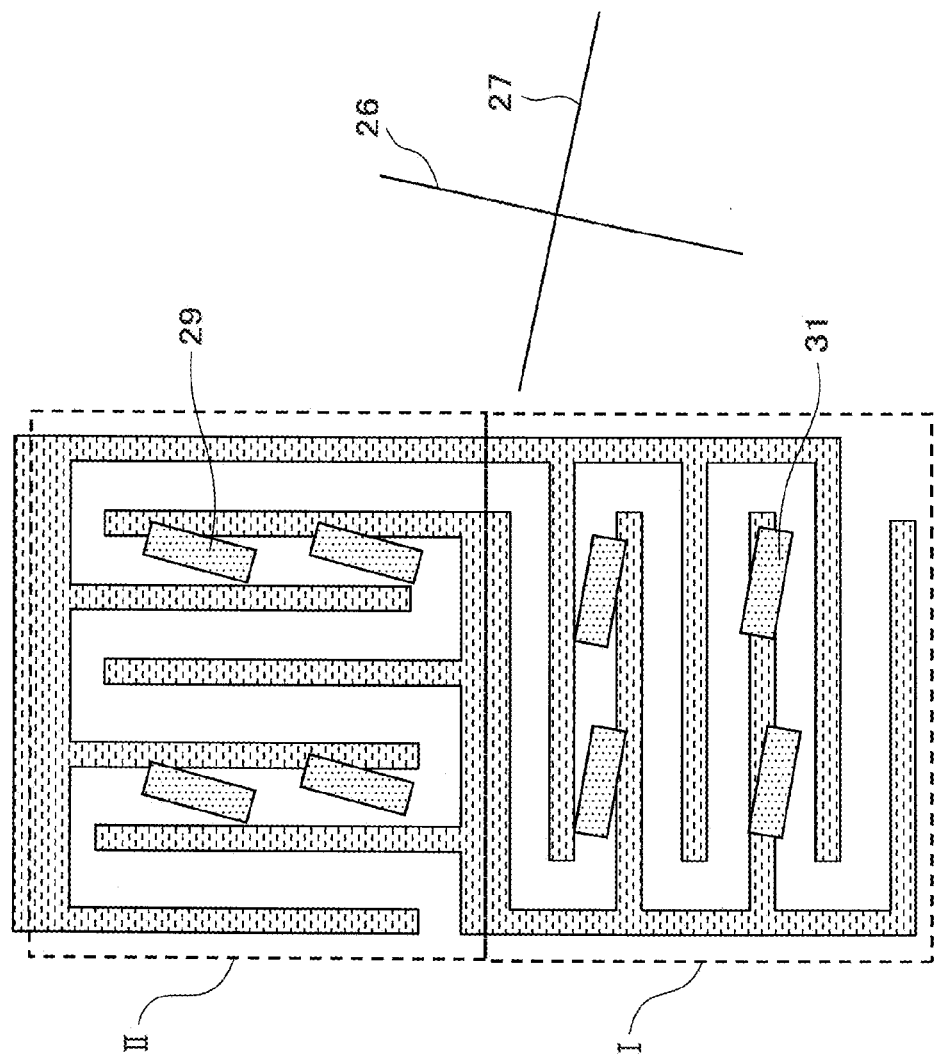
FIG. 19 is a plan view showing an alignment state of one pixel in the liquid crystal display device according to the seventh exemplary embodiment.

A seventh exemplary embodiment of the present invention will be described by referring to FIG. 17, FIG. 18, and FIG. 19. That is, the reference numerals used, in the explanations herein are disclosed in some of the drawings FIG. 17 to FIG. 19. FIG. 17 is a plan view of a single pixel. FIG. 18 shows a sectional view taken along line A-A' of FIG. 17. FIG. 19 shows division of the initial alignment direction in the display region within the pixel.

The seventh exemplary embodiment will be described in details hereinafter by following the fabricating procedure.

First, 250 nm of chrome (Cr) as a first metal layer is deposited on the substrate 20 constituted with a first, glass substrate, and patterns of the scan line 3 and the common signal, wiring 2 are formed on the chrome. Subsequently, 400 nm of silicon nitride (SiNx) is deposited as the gate insulating film 13, 200 nm of amorphous silicon hydride (a-Si: H) and 50 nm of n-type amorphous silicon hydride (n-a-Si: H) are deposited in a stacked manner as the thin film semiconductor layer 6, and patterning is performed by leaving the thin film, semiconductor layer 6 only in a TFT past to be a switching element of the pixel.

Furthermore, 250 nm of chrome as a second metal layer is deposited, and a part of the patterns of the data line 4, the source electrode 7s as well as the drain electrode 7d of the TFT and a pixel electrode 34 constituted with the second metal layer is formed on the chrome. Subsequently, the n-type amorphous silicon hydride (n-a-Si: H) of the thin film, semiconductor layer 6 in the TFT part is removed by having the source, electrode 7s and the drain electrode 7d of the TFT as the mask.

Then, 600 nm of silicon nitride (SiNx) is deposited as the protection insulating film 14, and a through-hole 38 for connecting the pixel electrode 34 and a through-hole 37 for connecting the common electrode 35 are formed in the silicon nitride. Further, 80 nm of ITO is deposited thereon as a second transparent electrode, and a pattern of the pixel electrode 34 and a pattern, of the common electrode 35 are formed on the ITO. The pixel electrode 34 and the common electrode 35 are in a form in which the striped pattern is connected at both ends while fitting the comb-like shapes with each other. The widths of the pixel electrode 34 and the common electrode 35 are set as 3.5 μm, respectively, and the space between the pixel electrode 34 and the common electrode 35 is set as 7 μm.

The stripe pattern of the pixel electrode 34 and the common electrode 35 in the region II in the upper half part of the pixel is extended in the longitudinal, direction (the direction perpendicular to the scan direction 3), and it is extended in the lateral direction (the direction in parallel to the scan line 3) in the region I in the lower half part of the pixel so that the patterns are orthogonal to each other. Further, a part 36 of the common electrode 35 shields the data line 4, the scan line 3, and the region between the seam line 3 and the common signal wiring 2. The TFT array substrate is formed through the above-described method.

In the first exemplary embodiment shown in FIG. 2, the liquid crystal 12 is rotated in the plane by the fringe, electric field formed between the common electrode 1 that, is formed in a flat form and the striped pixel electrode 5 disposed thereon via the gate insulating film 13 and the protection insulating film 14. In the meantime, in the seventh exemplary embodiment, the liquid crystal 12 is rotated in the plane by generating a lateral electric field between the pixel electrode 34 and the common electrode 35 formed in a comb-like shape.

In the seventh exemplary embodiment, the initial alignment directions 31, 29 of the liquid crystal 12 in the regions I and II are set in the direction rotated clockwise by 15 degrees with respect to the extending direction of the pixel electrode 34 and the common electrode 35 formed in the comb-like shape. The other structures of the seventh exemplary embodiment are the same as those of the first exemplary embodiment. The absorption axis of the incident-side polarization plate 22 is set to be the same as the initial alignment direction 31 of the region I, and the absorption axis of the exit-side polarization plate 23 is set to be orthogonal thereto. Further, the outside A-plate 24 and the C-plate 25 are disposed in this order from, the substrate 21 side between the polarization axis of the exit-side polarization plate 23 and the substrate 21. As in the case of the first exemplary embodiment, the in-cell retarder 10 is formed in each of the regions I and II, and the total retardation of the liquid crystal layer 12a and the in-cell retarder 10 is set as 550 nm. Here, the refractive index anisotropy of the liquid crystal layer 12a is set as $\Delta n = 0.075$ and the thickness of the liquid crystal layer 12a is set as 4 μm thereby to make the retardation of the liquid crystal layer 12a as 300 nm. Accordingly, the retardation of the in-cell retarder 10 is set as 250 nm.

The black display viewing angle property of the seventh exemplary embodiment becomes the same as the property that is acquired by rotating the black display viewing angle property of the first exemplary embodiment shown in FIG. 7C clockwise by 15 degrees. Thus, a line viewing angle property can be acquired. With such electrode structure and layout of the initial alignment directions, the optical elements shown, in the second to fifth exemplary embodiments can also be disposed. In this case, it is also possible to acquire the fine viewing angle properties acquired by rotating the black display viewing, angle properties of the second to fifth, exemplary embodiments clockwise by 15 degrees, respectively.

Eighth Exemplary Embodiment

Figure 20:
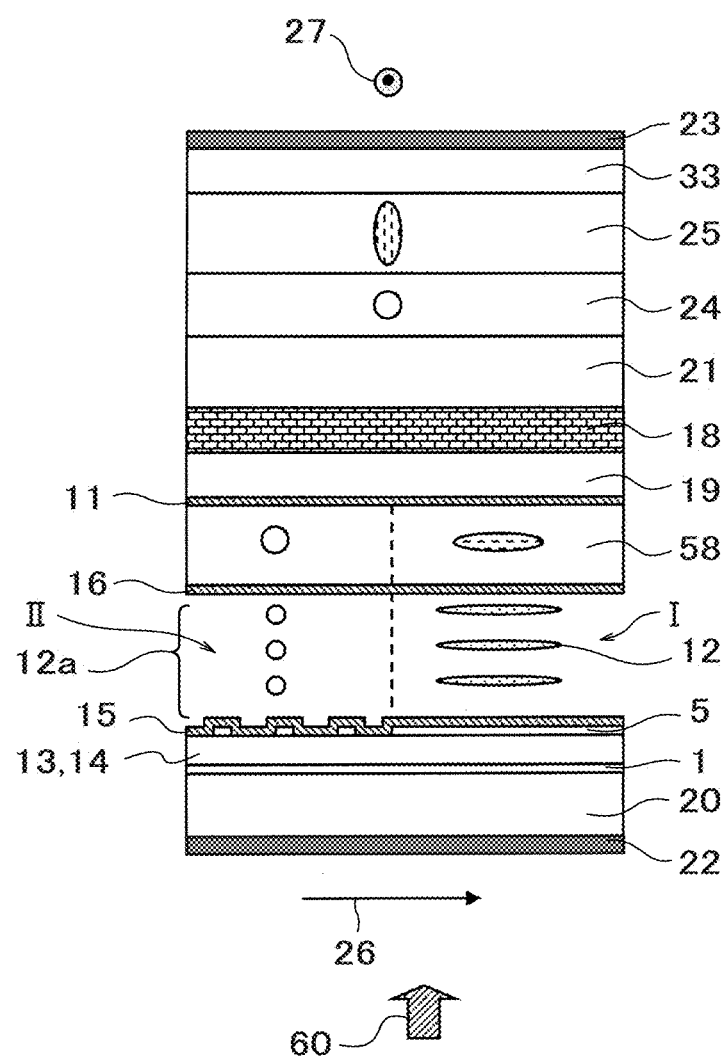
FIG. 20 is a sectional, view showing a layout of optical elements in a liquid crystal display device according to an eighth exemplary embodiment.

In an eighth exemplary embodiment, the structure of the pixels and the layout of the optical elements are designed to be the same as those of the first exemplary embodiment and, as shown in FIG. 20, an in-cell retarder 58 as a first optical compensation layer disposed between the transparent insulating substrate 21 and the liquid crystal layer 12a is designed to have negative refractive index anisotropy. The direction of the anisotropy axis of the in-cell retarder 58 is set to be the same as the initial alignment direction of the liquid crystal 12. The extent of the retardation of the in-cell retarder 58 is so set that the absolute value thereof is equivalent to the retardation of the liquid crystal layer 12a and the sign thereof is opposite. Thereby, the total retardation of the both, can be set about 0 nm.

In this case, when the polarized light in the direction of p' passed through the incident-side polarization plate 22 in the region II passes through the liquid crystal layer 12a and die in-cell retarder 58, the retardation subjected thereupon becomes about 0 nm in total. Thus, the phase difference between the normal light and the abnormal light becomes about zero, so that the polarization direction after passing through the liquid crystal layer 12a and the in-cell retarder 58 in this case is also returned almost to the direction of p'. Therefore, it is possible to acquire, a fine black display from the oblique view field also in the region II by the A-plate 24 and the C-plate 25. As a result, the black display viewing angle property as the entire display together with the region II and the region I can become a fine property.

Figure 21:
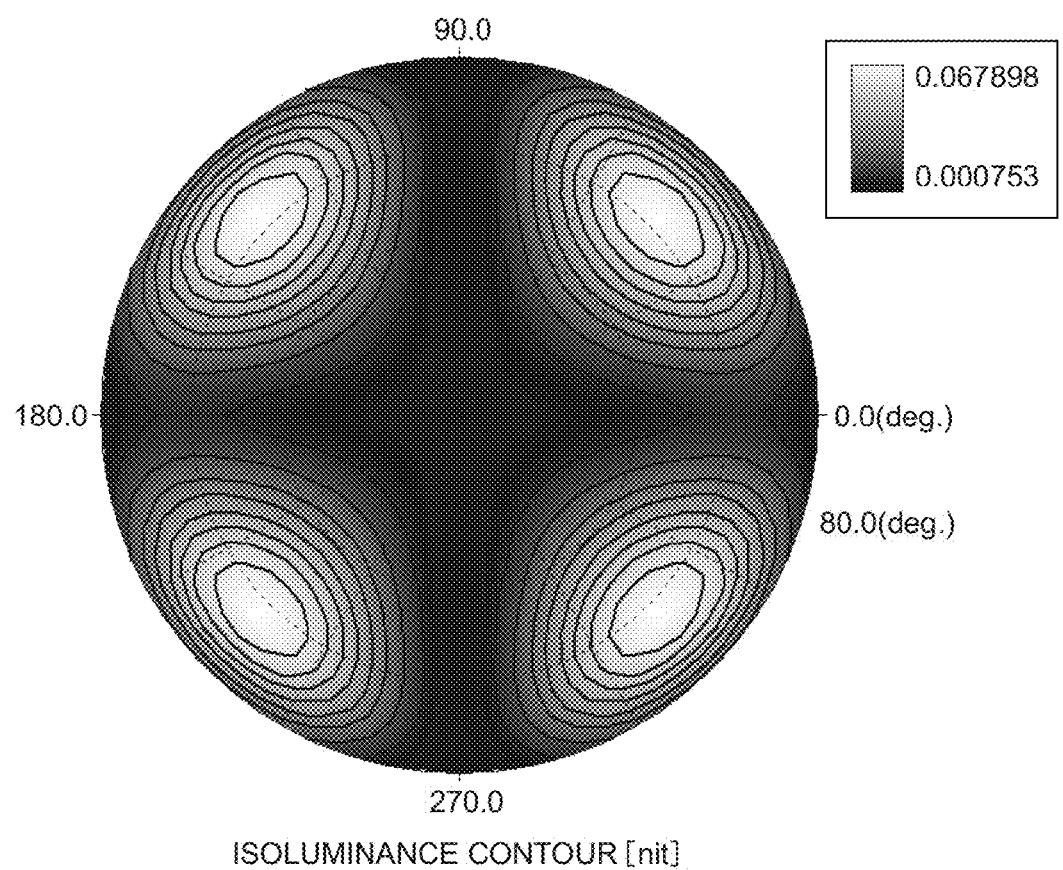
FIG. 21 is an illustration of the viewing angle property of black display in the liquid crystal display device according to the eighth exemplary embodiment.

With the eighth exemplary embodiment, the maximum value of the black luminance from the oblique view field is about 0.07 cd/m$^2$, as shown in FIG. 21. Therefore, it is possible to acquire a still more perfect black display viewing angle property.

To employ the type exhibiting the negative uniaxial refractive index anisotropy for the in-cell retarder 58 can be done also with the structure of the third exemplary embodiment. The black display viewing property of such case is equivalent to that of the property of the eighth exemplary embodiment shown in FIG. 21. The sum of the retardation of the in-cell retarder 58 and that of the liquid crystal layer 12a is set as 0 nm in the eighth exemplary embodiment.

However, as a result of investigations, it is found, that an almost equivalent fine property can be acquired by setting the sum of the retardation to fall within the range of −50 nm to 50 nm.

Ninth Exemplary Embodiment

Figure 22:
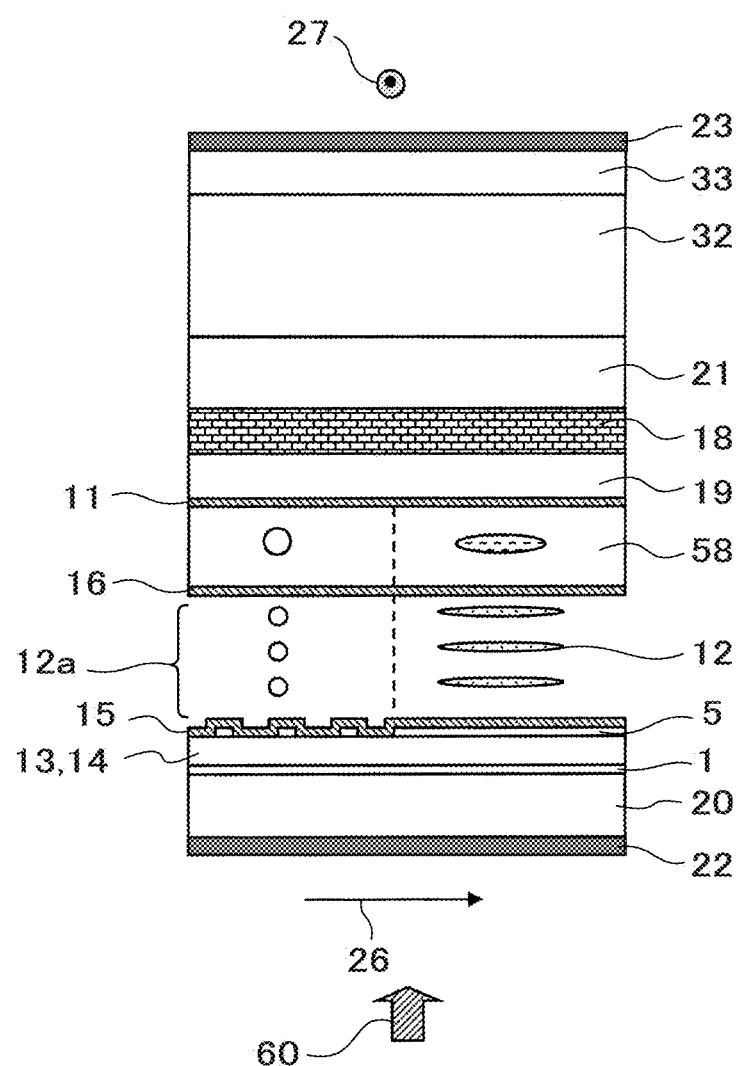
FIG. 22 is a sectional, view showing a layout, of optical, elements in a liquid crystal display device according to a ninth exemplary embodiment.

In an ninth exemplary embodiment, the structure of the pixels and the layout of the optical elements are designed to be the same as those of the second exemplary embodiment and, as shown in FIG. 22, the in-cell retarder 58 disposed between the transparent insulating substrate 21 and the liquid crystal layer 12a is designed to have negative refractive index, anisotropy.

The direction of the anisotropy axis of the in-cell retarder 58 is set to be the same as the initial alignment direction of the liquid crystal 12. The extent, of the retardation of the in-cell retarder 58 is so set that the absolute value thereof is equivalent, to the retardation of the liquid crystal layer 12a and the sign thereof is opposite. Thereby, the total retardation of the both can be set as about 0 nm.

Figure 23:
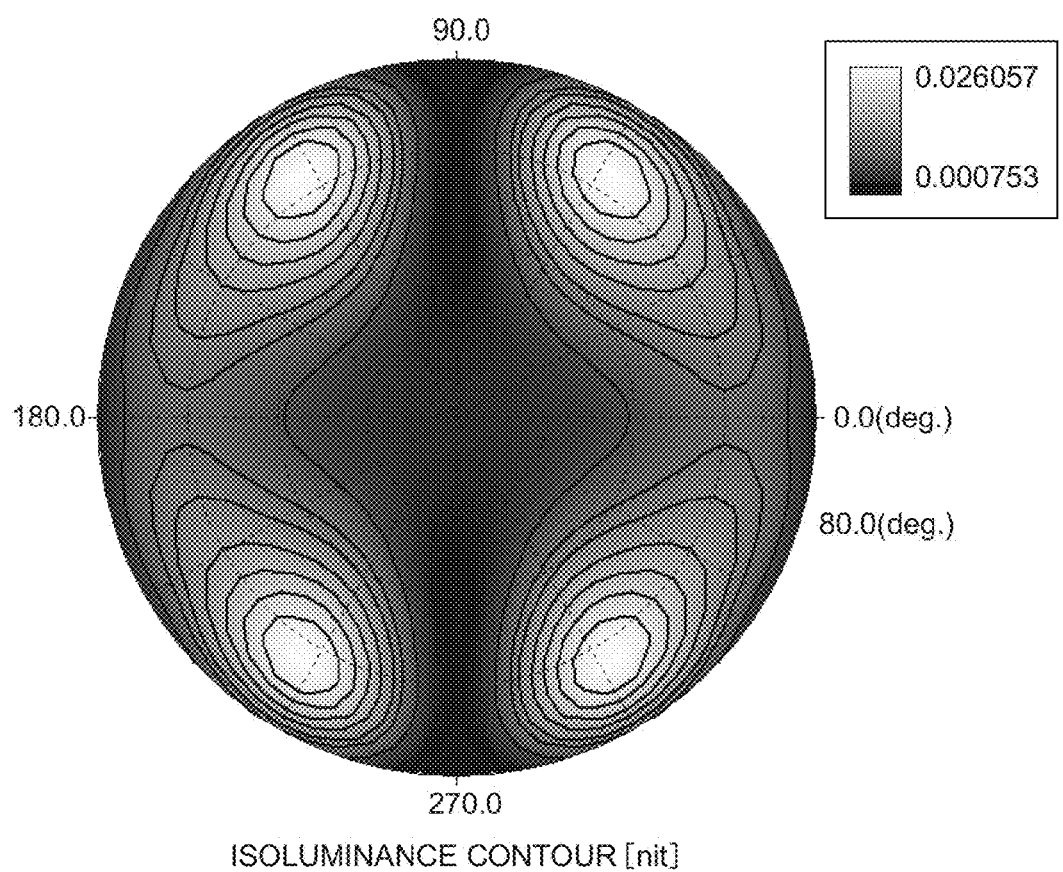
FIG. 23 is an illustration of the viewing angle property of black display in the liquid crystal display device according to the ninth exemplary embodiment.

With the ninth exemplary embodiment, the maximum value of the black luminance from the oblique view field is about 0.03 cd/m$^2$, as shown in FIG. 23. Therefore, it is possible to acquire a fine black display viewing angle property as in the case of the eighth exemplary embodiment. To employ the type exhibiting the negative uniaxial refractive index anisotropy for the in-cell retarder 58 can be done also with the structure of the fourth exemplary embodiment. The black display viewing property of such case is equivalent to that of the property of the ninth exemplary embodiment shown in FIG. 23. The sum of the retardation of the in-cell retarder 58 and that of the liquid crystal layer 12a is set as 0 nm in the ninth exemplary embodiment. However, as a result of investigations, it is found, that an almost equivalent fine property can be acquired by setting the sum of the retardation to fall within the range of −50 nm to 50 nm.

Effects of Exemplary Embodiments of the Present Invention

Next, effects of the exemplary embodiments of the present invention will be described in details. It is possible with, the exemplary embodiments of the present invention to provide the fine lateral, electric field type liquid crystal display device with wide viewing angles having the two regions where the liquid crystal alignment directions in the initial alignment state are set to be orthogonal to each other, with which a fine display can be acquired at the time of the black display even when viewed from the oblique view field.

In the followings, the reasons for making it possible to acquire a fine display at the time of black display even when viewed from the oblique view field in the fine lateral electric field type liquid crystal display device with wide viewing angles having the two regions where the liquid crystal alignment directions in the initial alignment state are set to be orthogonal to each other will be described regarding the following case (see FIG. 1). In each of the regions, the first optical compensation layer exhibiting the uniaxial optical anisotropy in the same direction as the initial alignment direction of the liquid crystal is disposed between at least one of the two transparent insulating substrates and the liquid crystal layer. The second optical compensation layer exhibiting the uniaxial optical anisotropy in the direction in parallel to the absorption axis of the exit-side polarization plate is disposed between the exit-side polarization plate and the substrate. Further, the third optical, compensation layer exhibiting the uniaxial optical anisotropy in the direction perpendicular to the substrate is disposed between the second optical compensation layer and the exit-side polarization plate.

Out of the two regions where the initial alignment directions are orthogonal to each other, the region having the initial alignment direction in parallel to the absorption axis of the incident-side polarization plate is defined as the region I, and the region having the initial alignment direction orthogonal thereto is defined as the region II. In both of the regions I and II, the absorption axis of the incident-side polarization plate and the absorption axis of the exit-side polarization plate are orthogonal to each other, and the initial alignment direction of the liquid crystal layer and the optical axis of the optical compensation layer sandwiched therebetween are in parallel to one of the absorption axes or orthogonal to the substrates. Therefore, when the display surface is viewed from, the front, the transmittance is suppressed to be low. As a result, a fine black display can be acquired.

Next, there is considered a case of viewing from the oblique view field in the direction making an angle of 45 degrees with respect to the absorption axes of the both polarization plates. It is defined here that the unit vector in the direction of the absorption axis of the incident-side polarization plate is p, the unit vector of the absorption axis of the exit-side polarization plate is a, the unit vector in the direction of the director of the region I is n1, the unit vector of the director of the region II is n2, the direction of the optical axis of the phase compensation layer (the outside A-plate) exhibiting the positive uniaxial refractive index anisotropy in the direction in parallel to the absorption axis of the exit-side polarization plate as the second optical compensation layer placed between the exit-side polarization plate and the substrate is ap, the direction of the optical axis of the phase compensation layer (the C-plate) exhibiting the positive uniaxial refractive index anisotropy in the direction perpendicular to the substrate as the third optical compensation layer is cp, and the direction of the light ray is s.

The followings can be acquired provided that the transmission axis of the incident-die polarization plate in the direction perpendicular to the light ray s is p', the transmission axis of the exit-side polarization plate is a', the direction of the axis of the normal light of the director of the region I is n1', the direction of the axis of the normal light of the director of the region II is n2', the direction of the axis of the normal light of the A-plate is ap', and the direction of the axis of the normal light of the C-plate is cp'.

$$p'=p\times s$$

$$a'=a\times s$$

$$n1'=n1\times s$$

$$n2'=n2\times s$$

$$ap'=ap\times s$$

$$cp'=cp\times s$$

First, in the region I, the polarization axis of the light transmitted through the incident-side polarization plate becomes the direction of p'. The polarization axis thereof is the same as the alignment direction of the liquid crystal layer and the direction of the normal light of the retarder (the in-cell retarder) disposed within the cell as the first optical compensation layer since p=n1 and p'=n1'. Thus, the light transmits through the liquid crystal layer and the first optical compensation layer as it is. Subsequently, the light is subjected to the retardation by the uniaxial anisotropy in the direction of ap' when transmitting through the A-plate as the second optical compensation layer, and further subjected to the retardation by the uniaxial anisotropy in the direction of cp' when transmitting through the C-plate as the third optical compensation layer. As a result, the polarization axis of the direction of p' is rotated to the direction of the polarization axis pp1' that is orthogonal to the transmission axis a' of the exit-side polarization plate. Thereby, the light transmitting through, the exit-side polarization plate is being absorbed. Thus, the transmittance can be suppressed to be low, so that a fine black display can be achieved. This is the same principle as that of the related technique 2 with which the optical compensation layer suppresses the light leakage of the black display from the oblique view field.

In the meantime, the polarization axis of the light transmitted through the incident-side polarization plate also becomes the direction of p' in the region II. However, the direction of n2 of the director of the region II is perpendicular to p, so that n2' and p' are not the same. Thus, the polarization axis of the polarization light transmitted through the liquid crystal layer is changed by the retardation, of the liquid crystal. When the retardation of the liquid crystal layer 12a corresponds to $\lambda/2$ and there is no first optical compensation layer, for example, the light passed through the liquid, crystal layer changes to the direction p" that, is symmetric with respect to n2' as shown in FIG. 31B. Normally, with the lateral electric field type liquid crystal display device, the display is controlled by rotating the director of the liquid crystal. Thus, it is appropriate to set the retardation as about 300 to 400 nm. However, the value is close to $\lambda/2$ with respect to the wavelength of the visible light only with the retardation of the liquid crystal layer. Therefore, the polarization direction is largely modulated when the light passes through the liquid crystal layer as described above only with the liquid crystal, layer. Thus, even, when the A-plate and the C-plate are disposed as in the case of the related technique 2 for the light passed therethrough, it is not possible to acquire a fine black display viewing angle property.

In the meantime, in the exemplary embodiments of the present invention, the in-cell retarder as the first optical compensation layer exhibiting the positive uniaxial optical anisotropy in the same direction as the alignment direction of the liquid crystal layer is disposed within the liquid crystal cell to provide the liquid crystal layer and the in-cell retarder within, the liquid crystal cell, for setting the total retardation of the liquid crystal layer and the in-cell retarder to be 500 to 600 nm. Thereby, in the vicinity of 550 nm that is the typical wavelength of green as the center of the visible light region, the abnormal light comes to have the retardation almost the same length, as the wavelength with respect to the normal light when the light passes through the liquid crystal, layer and the in-cell retarder.

Figure 24:
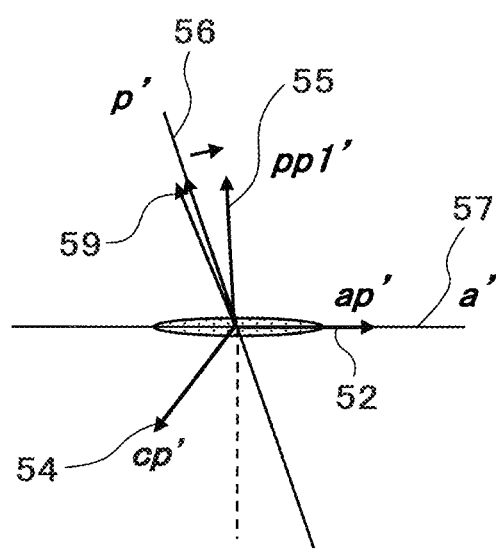
FIG. 24 is a chart showing the effect of the exemplary embodiments of the present invention.

Therefore, as shown in FIG. 24, the abnormal light comes to have a phase difference corresponding to $2\pi$ with, respect to the normal light, so that the polarization direction 59 of the light transmitted through the liquid crystal layer and the in-cell retarder is returned almost to the direction of p'. Thus, the polarization, direction of the light transmitting through the A-plate as the second optical compensation layer and the C-plate as the third optical compensation layer disposed between, the exit-side polarization plate and the substrate is rotated in the direction of pp1' as in the case of the region I.

Therefore, the light is absorbed in the exit-side polarization plate, so that the transmittance is suppressed to be low.

The use of the structures of the exemplary embodiments of the present invention in the manner described above makes it possible to acquire a fine black, display when viewed from the oblique view field also in the region II. As a result, the black display viewing angle property as the entire display together with the region II and the region I can become a fine property.

Further, in a case where each pixel is constituted with sub-pixels having color filters of two colors or more in the liquid crystal display device described above, it is desirable for the sum of the retardation of the first optical compensation layer and the retardation of the liquid crystal layer in each sub-pixel to be equivalent to the wavelength that is selected from a range of 90% or higher of the peak, of the transmittance spectrum of each color filter. With this, when the polarized light in the direction of p' transmits through the liquid crystal layer and the in-cell retarder in the region II, the phase difference between the normal light and the abnormal light becomes $2\pi$ more perfectly in the sub-pixels of each color. Therefore, the polarization direction 59 after passing through the liquid crystal layer and the in-cell retarder can be made still closer to the direction p'. As a result, the above-described principle can perfectly be brought into actions, so that a still finer black display viewing angle property can be acquired.

Further, in the case where the refractive index anisotropy of the in-cell retarder as the first optical compensation layer is set as the negative uniaxial anisotropy, the direction of the anisotropy axis of the in-cell retarder is set to be same as the initial alignment direction, of the liquid crystal material, and the extent, of the retardation of the in-cell retarder is set to have an equivalent absolute value but an opposite sign with respect to the retardation of the liquid crystal to make the total retardation of the both as about 0 nm, following effects can be acquired.

In the region II, the polarized light in the direction of p' passed through the incident-side polarization plate is subjected to the retardation, of about 0 nm in total when, passing through the liquid crystal layer and the in-cell retarder. Thus, the phase difference between the normal light and the abnormal light becomes about zero, so that the polarization direction 59 after passing through the liquid crystal layer and the in-cell retarder in this case is also returned almost to the direction of p' as shown in FIG. 24. Therefore, it is possible to acquire a fine black display from the oblique view field also in the region II by the second optical compensation layer and the third optical compensation layer. As a result, the black display viewing angle property as the entire display together with the region II and the region I can become a fine property.

In the above explanations, described is the case where the second optical compensation, layer and the third optical compensation layer are disposed between the exit-side polarization plate and the substrate. The same also applies to a case where the A plate as the second optical compensation layer exhibiting the uniaxial anisotropy in the direction in parallel to the absorption axis of the incident-side polarization plate is disposed between the incident-side polarization plate and the substrate and the C-plate as the third optical compensation, layer exhibiting the uniaxial anisotropy in the direction perpendicular to the substrate is disposed between the second optical compensation layer and the incident-side polarization, plate.

In this case, when the light makes incident from the oblique view field direction, the polarization direction of the polarized fight of the light immediately after transmitted through the incident-side polarization plate is directed towards the direction of p'. Thereafter, the polarization direction of the light transmitted through the C-plate and the outside A-plate is rotated, to the direction orthogonal to a'.

In the region II, the minor axis direction n2' of the refractive index anisotropy of the liquid crystal layer and the in-cell retarder matches a'. Thus, the polarization direction of the light transmitted therethrough is not changed. Further, this polarization direction is the direction completely absorbed in the exit-side polarization plate, so that the transmittance can be suppressed to be low.

In the region I, the minor axis direction n1' of the refractive index anisotropy of the liquid crystal layer and the in-cell retarder matches p'. Thus, there is generated retardation in the abnormal light direction orthogonal, to the normal light direction that is the main axis direction thereof for the light transmitted therethrough. However, through setting the retardation as the total of the liquid crystal layer and the in-cell retarder as 500 to 600 nm, the abnormal light of the light transmitted therethrough is subjected to the retardation of one wavelength with respect to the normal light. As a result, the polarization direction is returned almost to the direction of p'. Thus, through disposing the in-cell retarder. It is also possible to suppress the transmittance to be low and to acquire a fine black display from the oblique view field in the region I as well.

In the above explanations, the A-plate as the second optical compensation layer and the C-plate as the third optical compensation layer are disposed between the exit-side polarization plate and the substrate to rotate the polarization direction of the direction of p' to the polarization direction orthogonal to a'. However, the same can be achieved by disposing an optical, compensation layer exhibiting the biaxial refractive index anisotropy equivalent to the second optical compensation layer and the third optical compensation layer as a fourth, optical compensation layer instead of the second optical compensation layer and the third optical compensation layer. In this case, the direction of the main axis of the fourth optical compensation layer exhibiting the biaxial optical anisotropy becomes three directions, i.e., the direction in parallel to the absorption axis of the polarization plate in the plane in parallel to the substrate, the direction perpendicular thereto, and the direction perpendicular to the substrate. In this case, it is also possible to acquire a fine black display even from the oblique view field through setting the relation between the first optical compensation layer and the liquid crystal layer in the manner described above. Further, in the above-described lateral electric field, type liquid crystal display device having the two regions where the initial alignment directions of the liquid crystal are orthogonal to each other, the directions of the lateral electric field generated in the two regions are orthogonal to each other. Thus, through setting the angle formed between the alignment direction of the liquid crystal and the direction of the lateral electric field as substantially the same in the region I and the region II, the liquid crystal directors are rotated in the region I and the region II while keeping the orthogonal state. In this case, two polarization plates having the absorption axes orthogonal to each other are disposed on the outside of the two substrates, the initial alignment direction of the liquid crystal matches either one of the orthogonal absorption axes, the first optical compensation layer exhibiting the uniaxial optical anisotropy in the same direction as the initial alignment direction of the liquid crystal is disposed at least between one of the substrates and the liquid crystal layer in each region, and the second optical compensation layer and the third optical compensation layer or the fourth optical compensation layer alone are/is disposed between one of the substrates and the polarization, plate disposed on the substrate side.

Figure 26B:
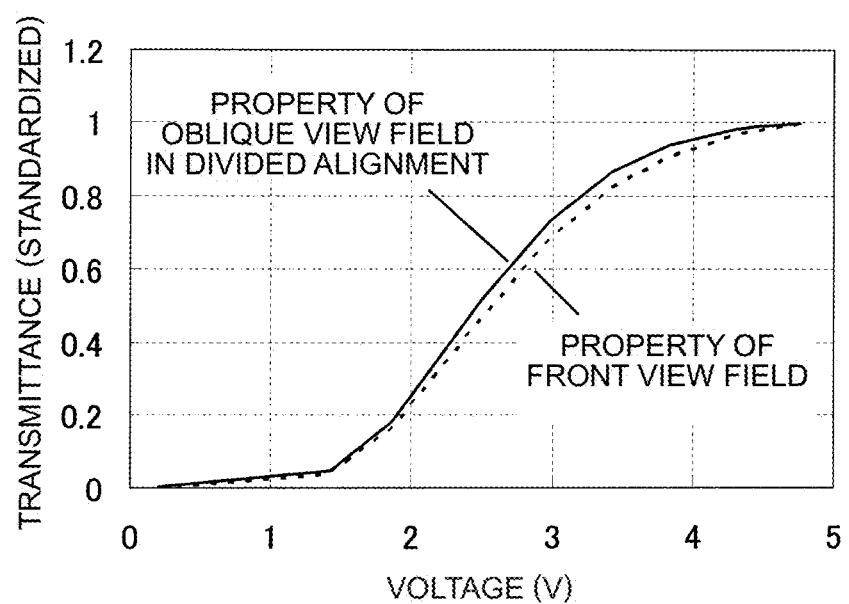
FIG. 26B is a graph showing an example of the improvement regarding the viewing angle property of voltage-luminance property achieved by the related technique 1.

Thus, shift of the voltage-transmittance property from the oblique view field of the initial alignment direction of the liquid crystal, which is the issue with the region I or the region II alone illustrated in FIG. 25 and FIG. 26 regarding the related technique 1, can be suppressed dramatically by compensating the viewing angle properties of each other through designing the both regions to have the same-size area. In this case, the optical, axes of the first optical, compensation layer, the second optical compensation layer, the third optical compensation layer, and the fourth optical compensation layer are in the directions matching either one of the absorption axes of the two polarization plates of in the direction perpendicular to the substrate. Therefore, there is no influence imposed upon the voltage-luminance property shown in FIG. 26, so that a fine voltage-luminance property viewing angle dependency can be acquired.

While the present invention has been described above by referring to the specific exemplary embodiments shown in the accompanying drawings, the present invention is not limited only to each of the exemplary embodiments. Any changes and modifications occurred to those skilled in the art can be applied to the structures and the details of the present invention. Further, it is to be noted that the present invention includes combinations of a part of or the entire part of the structures of each of the exemplary embodiments combined mutually in an appropriate manner. While a part of or the entire part of the exemplary embodiments can be summarized as in following Supplementary Notes, the present invention is not necessarily limited to those structures, (Supplementary Note 1)

A lateral electric field type liquid crystal display device which includes:

two transparent insulating substrates that are in parallel to each other;

a liquid crystal layer sandwiched between the substrates, the liquid crystal layer including liquid crystal which is aligned in a direction substantially in parallel to the substrates and to which a lateral electric field substantially in parallel to the substrates is applied;

a region I and a region II where initial alignment directions of the liquid crystal are orthogonal to each other;

two polarization plates having absorption axes that are orthogonal to each other and match either one of the initial alignment directions of the region I and the region II, one each, of the polarization plates being disposed on outside of the two substrates, respectively;

a first optical compensation layer disposed between at least one of the substrates and the liquid crystal layer, the compensation layer exhibiting uniaxial optical anisotropy in a direction same as the initial alignment direction of the liquid crystal;

a second, optical compensation layer disposed between one of the substrates and the polarization plate disposed on that substrate side, the compensation layer exhibiting uniaxial optical anisotropy in a direction in parallel to an absorption axis of the polarization plate; and a third optical compensation layer disposed between the second optical compensation layer and the polarization plate closest to the second optical compensation layer, the compensation layer exhibiting uniaxial optical anisotropy in a direction perpendicular to the substrate.

(Supplementary Note 2)

A lateral electric field type liquid, crystal display device which includes:

two transparent insulating substrates that are in parallel to each other;

a liquid crystal layer sandwiched between the substrates, the liquid crystal layer including liquid crystal which is aligned in a direction substantially in parallel to the substrates and to which an electric field substantially in parallel to the substrates is applied;

a region I and a region II where initial alignment directions of the liquid crystal are orthogonal, to each other;

two polarization, plates having absorption axes that are orthogonal to each other and match either one of the initial alignment directions of the region I and the region II, one each of the polarization plates being disposed on outside of the two substrates, respectively;

a first optical compensation layer disposed between at least one of the substrates and the liquid crystal layer, the compensation layer exhibiting uniaxial optical anisotropy in a direction same as the initial alignment direction of the liquid crystal; and a fourth optical compensation layer disposed between one of the substrates and the polarization plate disposed on that substrate side, the compensation layer exhibiting biaxial optical anisotropy, wherein a main axis of the fourth optical compensation layer is in a direction in parallel to an absorption axis of the polarization plate in a plane in parallel to the substrate, in a direction perpendicular thereto, and in a direction perpendicular to the substrate.

(Supplementary Note 3)

The lateral electric field, type liquid crystal, display device as depicted in Supplementary Note 1 or 2, wherein:

the first optical, compensation layer exhibits positive uniaxial refractive index anisotropy; and sum of retardation of the first optical compensation, layer and retardation of the liquid crystal layer is within a range of 500 to 600 nm.

(Supplementary Note 4)

The lateral electric field type liquid crystal display device as depicted in Supplementary Note 1 or 2, which further includes pixels each constituted with a plurality of sub-pixels having a color filter, wherein sum of retardation of the first optical compensation layer and retardation of the liquid crystal, layer in each of the sub-pixels is equivalent to a wavelength that is selected from a range of 90% or more from a peak of a transmittance spectrum of the color filter provided to the sub-pixel.

(Supplementary Note 5)

The lateral electric field type liquid crystal display device as depicted in Supplementary Note 1 or 2, wherein:

the first optical compensation layer exhibits negative uniaxial refractive index anisotropy; and sum of retardation of the first optical compensation layer and retardation of the liquid crystal layer is within a range of −50 to 50 nm.

(Supplementary Note 6)

The lateral, electric field, type liquid crystal display device as depleted in any one of Supplementary Notes 1 to 5, wherein;

in the region I and the region II directions of the lateral electric field are orthogonal to each other, and angles formed between the alignment directions of the liquid crystal and the directions of the lateral electric field are substantially same.

(Supplementary Note 11)

A lateral electric field type liquid crystal display device including a liquid crystal layer which is sandwiched between two transparent insulating substrates and is constituted with liquid crystal aligned in an azimuth substantially in parallel to the substrates, the display device controlling the display by changing the liquid crystal by an electric field substantially in parallel to the substrates, wherein:

two regions where initial alignment directions of the liquid crystal are orthogonal to each other are provided;

one each of two polarization plates having absorption axes that are orthogonal to each other is disposed on the outside of the two substrates, respectively;

the initial alignment directions of the liquid crystal match either one of the absorption axes;

in each of the two regions, a first optical compensation, layer exhibiting uniaxial optical anisotropy in a direction same as the initial alignment direction of the liquid, crystal is disposed between at least one of the substrates and the liquid crystal layer;

a second optical compensation, layer exhibiting uniaxial optical anisotropy in a direction in parallel to an absorption axis of the polarization plate is disposed between one of the substrates and the polarization plate disposed on that substrate side; and a third optical compensation layer exhibiting uniaxial optical anisotropy in a direction perpendicular to the substrate is further disposed between the second optical compensation layer and the polarization plate.

(Supplementary Note 12)

A lateral electric field type liquid crystal display device including a liquid crystal layer which is sandwiched between two transparent insulating substrates and is constituted with liquid crystal aligned in an azimuth substantially in parallel to the substrates, the display device controlling the display by changing the liquid crystal by a lateral electric field substantially in parallel to the substrates, wherein:

two regions where initial alignment directions of the liquid crystal are orthogonal, to each other are provided;

one each of two polarization plates having absorption axes that are orthogonal to each other is disposed on the outside of the two substrates, respectively;

the initial alignment directions of the liquid crystal match either one of the absorption axes;

in each of the two regions, a first optical compensation layer exhibiting uniaxial optical anisotropy in a direction same as the initial alignment direction of the liquid crystal is disposed between at least one of the substrates and the liquid crystal layer; and a fourth optical compensation layer exhibiting biaxial optical anisotropy is disposed between one of the substrates and the polarization plate disposed on that substrate side, wherein a main axis of the fourth optical compensation layer is in a direction in parallel to an absorption axis of the polarization plate in a plane in parallel to the substrate, in a direction perpendicular thereto, and in a direction perpendicular to the substrate, (Supplementary Note 13)

The lateral electric field type liquid crystal display device as depicted in Supplementary Note 11 or 12, wherein:

the first optical compensation layer exhibits positive uniaxial refractive index anisotropy; and sum of retardation of the first optical compensation layer and retardation of the liquid crystal layer is within a range of 500 to 600 nm.

(Supplementary Note 14)

The lateral electric field type liquid crystal display device as depicted in Supplementary Note 11 or 12, wherein each pixel of the liquid crystal display device is constituted with a plurality of sub-pixels having color filters of two or more colors, wherein in the sub-pixel, sum of retardation of the first optical compensation layer and retardation of the liquid crystal layer is equivalent to a wavelength that is selected from a range of 90% or more from a peak of a transmittance spectrum of each of the color filters, (Supplementary Note 15)

The lateral electric field type liquid crystal display device as depicted in Supplementary Note 11 or 12, wherein:

the first optical compensation layer exhibits negative uniaxial refractive index anisotropy; and sum of retardation of the first optical compensation layer and retardation of the liquid crystal, layer is within a range of −50 to 50 nm, (Supplementary Note 16)

The lateral electric field type liquid crystal display device as depicted in any one of Supplementary Notes 11 to 15, wherein:

provided that the two regions are a region I and a region II, an azimuth of the lateral electric field generated, in the region I and an azimuth of the lateral electric field generated in the region II are orthogonal, to each other; and an angle formed between the azimuth of the liquid crystal and the azimuth of the lateral electric field in the region I and an angle formed between the azimuth of the liquid crystal, and the azimuth of the lateral electric field in the region II are substantially same.

INDUSTRIAL APPLICABILITY

The present invention can be utilized for a lateral electric field type active matrix liquid crystal display device and any apparatuses which use the liquid crystal display device as the display device thereof.

What is claimed is:

1. A lateral electric field type liquid crystal display device, comprising:

two transparent insulating substrates that are in parallel to each other;

a liquid crystal layer sandwiched between the substrates, the liquid crystal layer including liquid crystal which is aligned in a direction substantially in parallel to the substrates and to which a lateral electric field substantially in parallel to the substrates is applied;

a region I and a region II where initial alignment directions of the liquid crystal are orthogonal to each other;

two polarization plates having absorption axes that are orthogonal to each other and match either one of the initial alignment directions of the region I and the region II, one each of the polarization plates being disposed on outside of the two substrates, respectively;

a first optical compensation layer disposed between at least one of the substrates and the liquid crystal layer, the first optical compensation layer exhibiting uniaxial optical anisotropy in directions the same as the initial alignment directions of the liquid crystal in respectively overlapped region I and region II;

a second optical compensation layer disposed between one of the substrates and the polarization plate disposed on that substrate side, the second optical compensation layer exhibiting uniaxial optical anisotropy in a direction parallel to an absorption axis of the polarization plate; and a third optical compensation layer disposed between the second optical compensation layer and the polarization plate closest to the second optical compensation layer, the third optical compensation layer exhibiting uniaxial optical anisotropy in a direction perpendicular to the substrate.

2. A lateral electric field type liquid crystal display device, comprising:

two transparent insulating substrates that are in parallel to each other;

a liquid crystal layer sandwiched between the substrates, the liquid crystal layer including liquid crystal which is aligned in a direction substantially in parallel to the substrates and to which an electric field substantially in parallel to the substrates is applied;

a region I and a region II where initial alignment directions of the liquid crystal are orthogonal to each other;

two polarization plates having absorption axes that are orthogonal to each other and match either one of the initial alignment directions of the region I and the region II, one each of the polarization plates being disposed on outside of the two substrates, respectively;

a first optical compensation layer disposed between at least one of the substrates and the liquid crystal layer, the first optical compensation layer exhibiting uniaxial optical anisotropy in directions the same as the initial alignment directions of the liquid crystal in respectively overlapped region I and region II; and a fourth optical compensation layer disposed between one of the substrates and the polarization plate disposed on that substrate side, the fourth optical compensation layer exhibiting biaxial optical anisotropy, wherein a main axis of the fourth optical compensation layer is in a direction in parallel to an absorption axis of the polarization plate in a plane parallel to the substrate, in a direction perpendicular thereto, and in a direction perpendicular to the substrate.

3. The lateral electric field type liquid crystal display device as claimed in claim 1, wherein:

the first optical compensation layer exhibits positive uniaxial refractive index anisotropy; and sum of retardation of the first optical compensation layer and retardation of the liquid crystal layer is within a range of 500 to 600 nm.

4. The lateral electric field type liquid crystal display device as claimed in claim 1, further comprising pixels each constituted with a plurality of sub-pixels, each of the sub-pixels having an individual color filter, wherein sum of retardation of the first optical compensation layer and retardation of the liquid crystal layer in each of the sub-pixels is equivalent to a wavelength that is selected from a range of 90% or more from a peak of a transmittance spectrum of the color filter provided to the sub-pixel.

5. The lateral electric field type liquid crystal display device as claimed in claim 1, wherein:

the first optical compensation layer exhibits negative uniaxial refractive index anisotropy; and sum of retardation of the first optical compensation layer and retardation of the liquid crystal layer is within a range of −50 to 50 nm.

6. The lateral electric field type liquid crystal display device as claimed in claim 1, wherein:

in the region I and the region II, directions of the lateral electric field are orthogonal to each other, and angles formed between the alignment directions of the liquid crystal and the directions of the lateral electric field are substantially the same.

7. The lateral electric field type liquid crystal display device as claimed in claim 2, wherein:
the first optical compensation layer exhibits positive uniaxial refractive index anisotropy; and
sum of retardation of the first optical compensation layer and retardation of the liquid crystal layer is within a range of 500 to 600 nm.

8. The lateral electric field type liquid crystal display device as claimed in claim 2, further comprising pixels each constituted with a plurality of sub-pixels, each of the sub-pixels having an individual color filter, wherein
sum of retardation of the first optical compensation layer and retardation of the liquid crystal layer in each of the sub-pixels is equivalent to a wavelength that is selected from a range of 90% or more from a peak of a transmittance spectrum of the color filter provided to the sub-pixel.

9. The lateral electric field type liquid crystal display device as claimed in claim 2, wherein:
the first optical compensation layer exhibits negative uniaxial refractive index anisotropy; and
sum of retardation of the first optical compensation layer and retardation of the liquid crystal layer is within a range of −50 to 50 nm.

10. The lateral electric field type liquid crystal display device as claimed in claim 2, wherein:
in the region I and the region II, directions of the lateral electric field are orthogonal to each other, and angles formed between the alignment directions of the liquid crystal and the directions of the lateral electric field are substantially the same.

\* \* \* \* \*